United States Patent
Grenda et al.

(10) Patent No.: US 8,524,837 B2
(45) Date of Patent: *Sep. 3, 2013

(54) HEAT-CURING POWDER-LACQUER COMPOSITIONS YIELDING A MATTE SURFACE AFTER CURING OF THE COATING, AS WELL AS A SIMPLE METHOD FOR PRODUCTION OF SAME

(75) Inventors: Werner Grenda, Herne (DE);
Emmanouil Spyrou, Schermbeck (DE);
Thomas Weihrauch, Duelmen (DE);
Christoph Lammers, Recklinghausen (DE); Holger Loesch, Herne (DE);
Klaus Behrendt, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 119 days.

This patent is subject to a terminal disclaimer.

(21) Appl. No.: 13/045,141

(22) Filed: Mar. 10, 2011

(65) Prior Publication Data

US 2011/0288202 A1    Nov. 24, 2011

(30) Foreign Application Priority Data

Mar. 11, 2010   (DE) .......................... 10 2010 002 785
Mar. 10, 2011   (DE) .......................... 10 2011 005 369

(51) Int. Cl.
*C08C 19/22*    (2006.01)

(52) U.S. Cl.
USPC ............. 525/374; 428/481; 524/81; 524/401; 525/384; 525/420; 525/425; 525/437; 525/934; 528/296; 528/298; 528/300; 528/301; 528/302; 528/307; 528/308; 528/308.6; 528/492

(58) Field of Classification Search
USPC .................. 428/481; 524/81, 401; 525/420, 525/425, 437, 934; 528/296, 298, 300, 301, 528/302, 307, 308, 308.6, 492
See application file for complete search history.

(56) References Cited

U.S. PATENT DOCUMENTS

| 4,101,606 | A * | 7/1978 | Cenci et al. ................... 525/218 |
| 6,710,136 | B2 | 3/2004 | Grenda et al. |
| 7,026,393 | B2 | 4/2006 | Wenning et al. |
| 7,300,997 | B2 | 11/2007 | Wenning et al. |
| 2004/0014855 | A1* | 1/2004 | Wenning ....................... 524/210 |
| 2004/0018374 | A1 | 1/2004 | Wenning et al. |
| 2004/0110907 | A1 | 6/2004 | Weiss et al. |
| 2004/0132924 | A1 | 7/2004 | Weiss et al. |
| 2005/0119437 | A1 | 6/2005 | Wenning et al. |
| 2007/0282089 | A1 | 12/2007 | Spyrou |
| 2008/0255272 | A1 | 10/2008 | Weiss et al. |
| 2011/0224459 | A1 | 9/2011 | Grenda et al. |
| 2011/0288202 | A1* | 11/2011 | Grenda et al. ................ 523/400 |

FOREIGN PATENT DOCUMENTS

| KR | 10-2009-0111720 |   | 10/2009 |
| KR | 1020090111720 | * | 10/2009 |

OTHER PUBLICATIONS

Jung et al.; J. Korean Ind. Eng. Chem., vol. 20, No. 2, Apr. 2009, p. 195-200.*
English translation of Jung et al.; J. Korean Ind. Eng. Chem., vol. 20, No. 2, Apr. 2009.*
U.S. Appl. No. 13/583,252, filed Sep. 10, 2012, Grenda, et al.
U.S. Appl. No. 13/583,826, filed Sep. 10, 2012, Grenda, et al.
U.S. Appl. No. 12/723,045, filed Mar. 12, 2010, Grenda, et al.
International Search Report issued May 26, 2011, in Patent Application No. PCT/EP2011/053639.

* cited by examiner

*Primary Examiner* — Robert Jones, Jr.
(74) *Attorney, Agent, or Firm* — Oblon, Spivak, McClelland, Maier & Neustadt, L.L.P.

(57) ABSTRACT

The invention relates to heat-curing powder-lacquer compositions exhibiting a matte surface after curing of the coating, as well as to a simple method for production of the same.

27 Claims, 11 Drawing Sheets

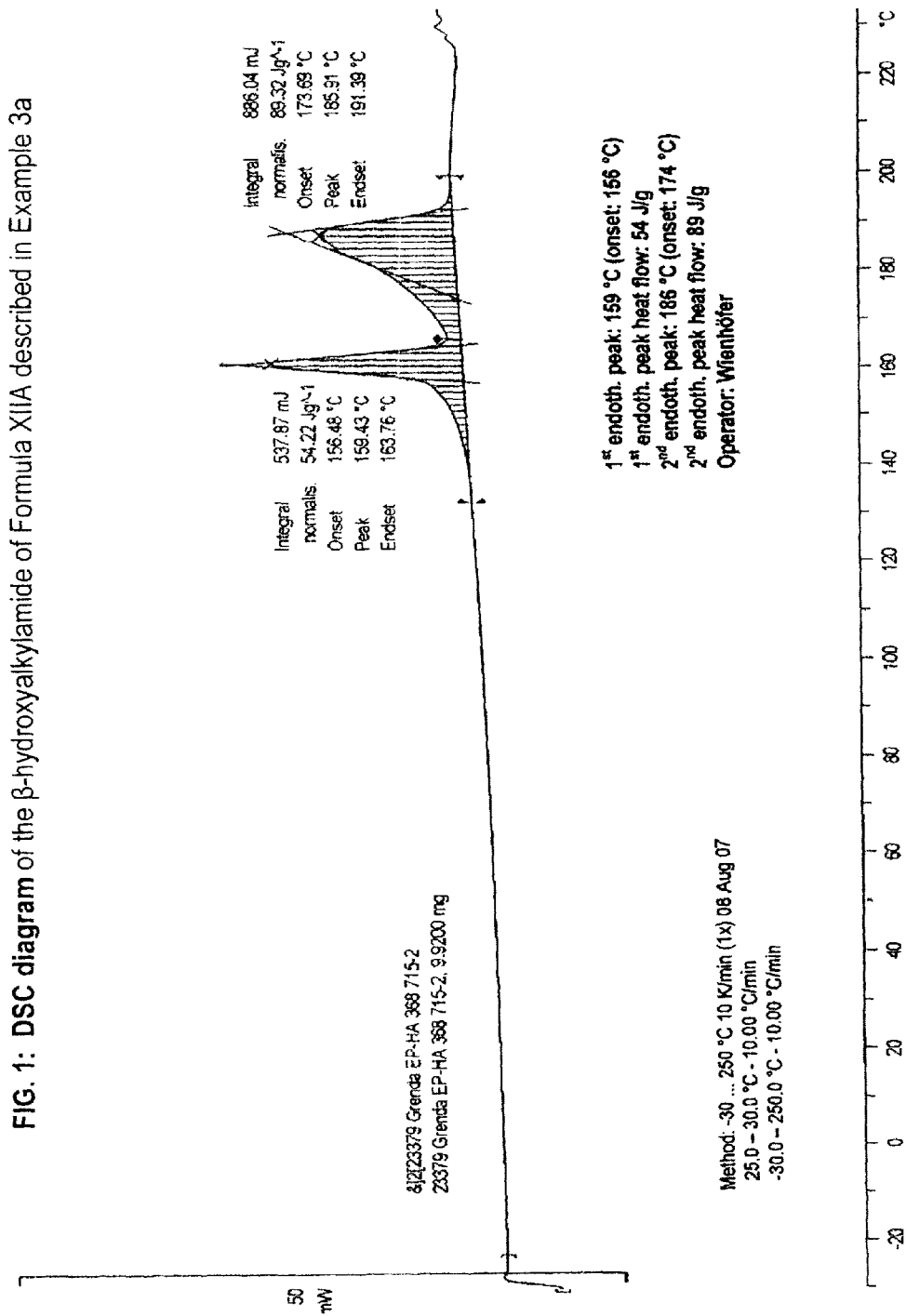
FIG. 1: DSC diagram of the β-hydroxyalkylamide of Formula XIIA described in Example 3a

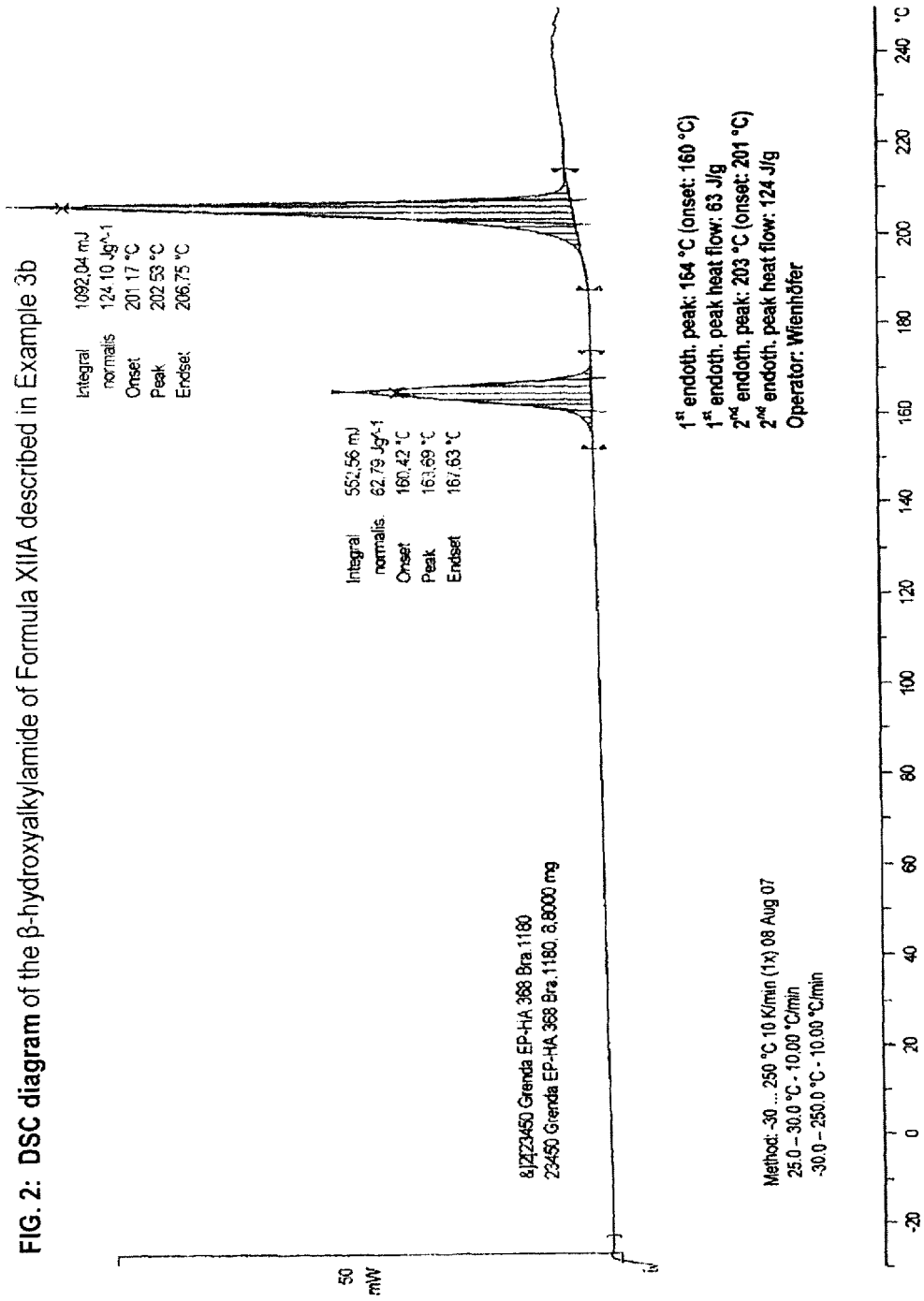
FIG. 2: DSC diagram of the β-hydroxyalkylamide of Formula XIIA described in Example 3b

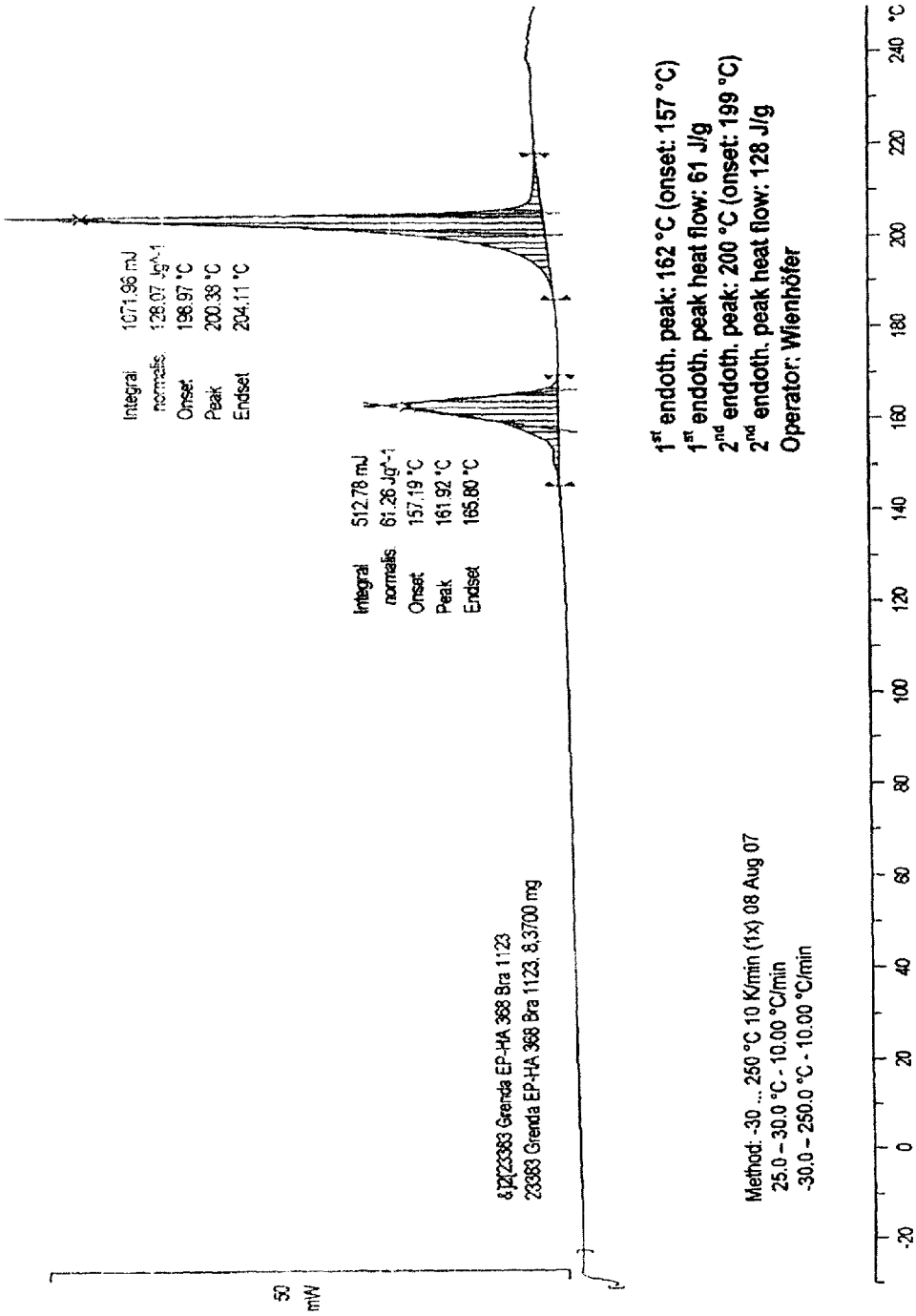
FIG. 3: DSC diagram of the β-hydroxyalkylamide of Formula XIIA described in Example 4b

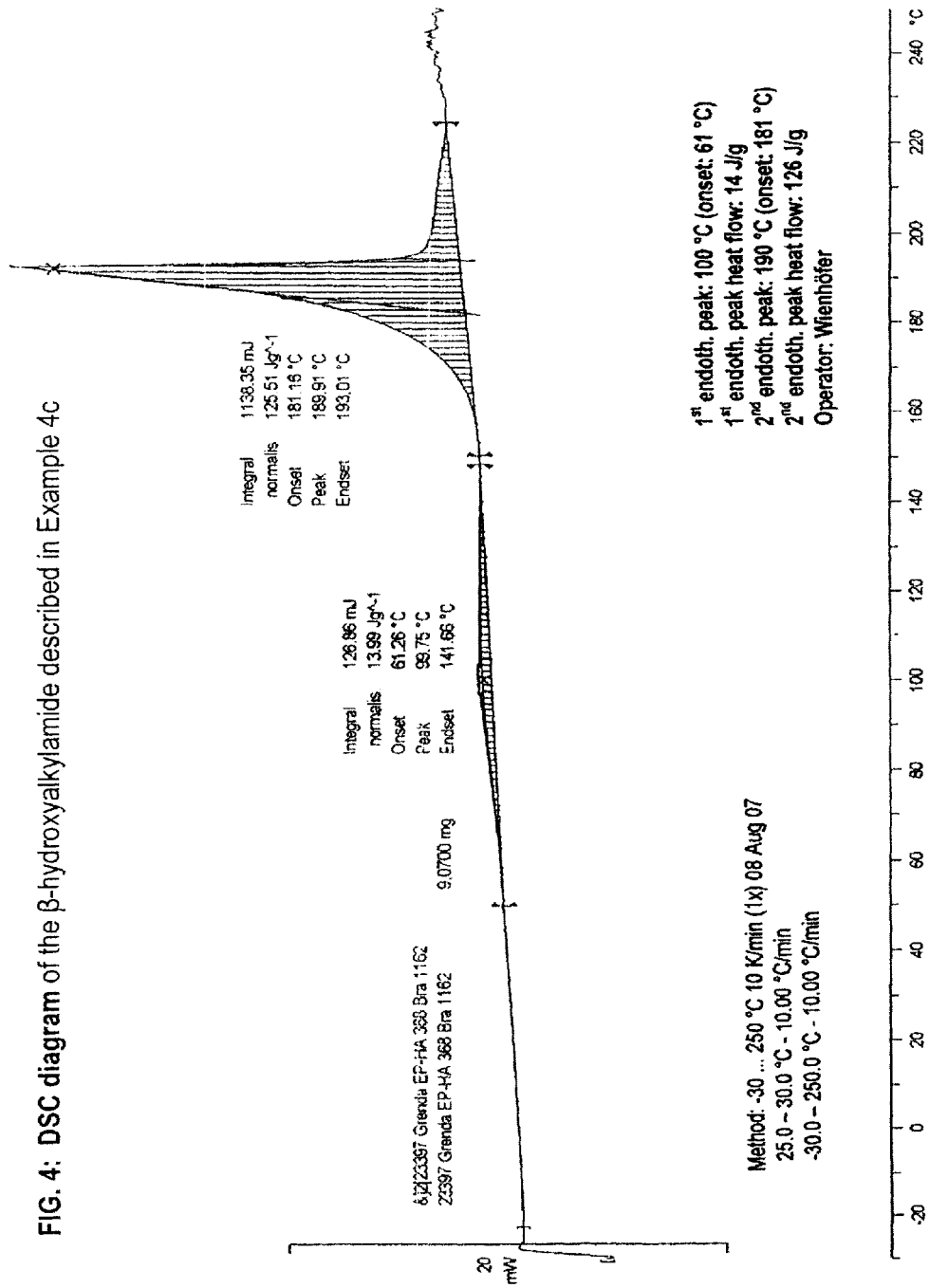
FIG. 4: DSC diagram of the β-hydroxyalkylamide described in Example 4c

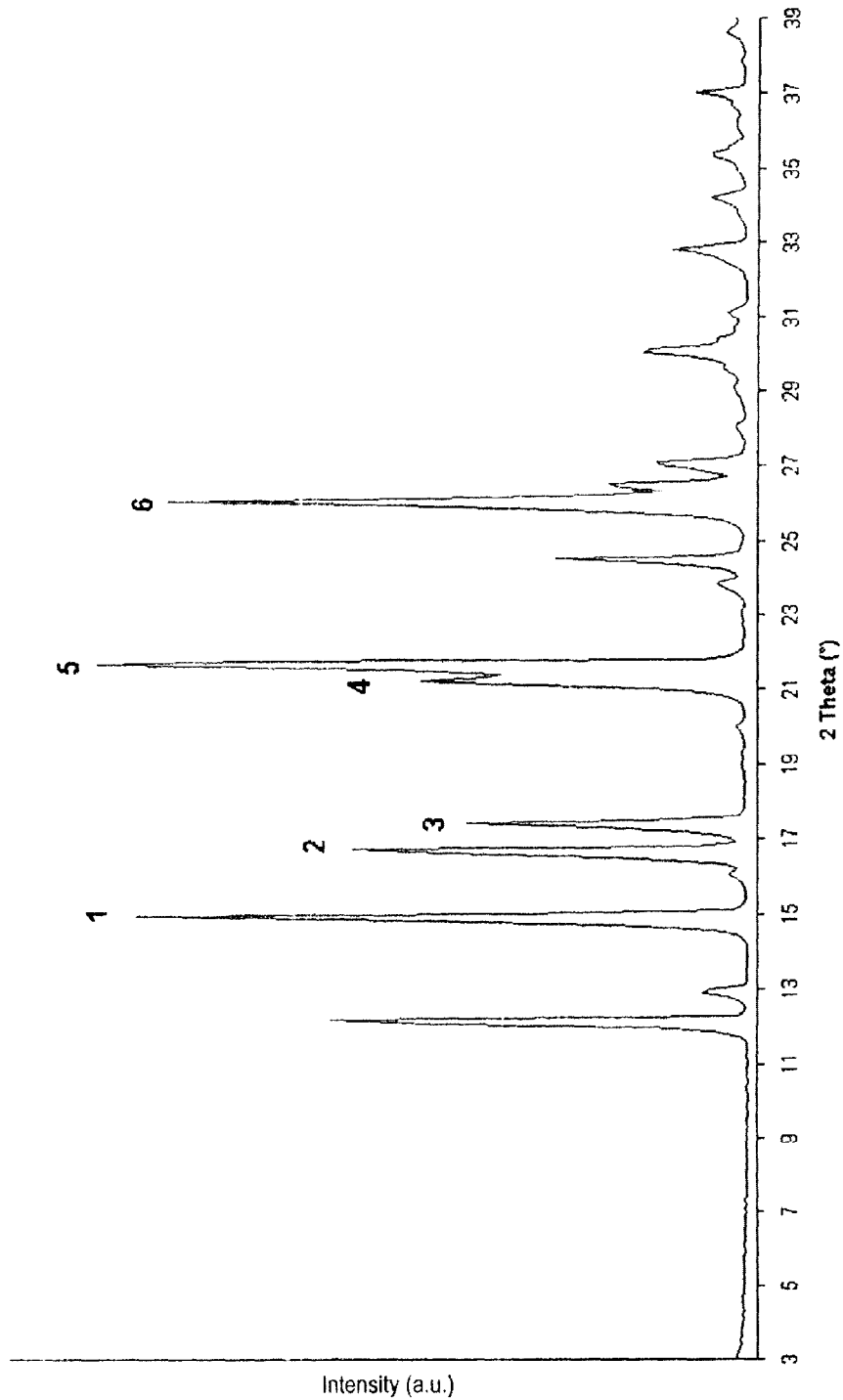
FIG. 5A: XRPD (x-ray powder diffraction) analysis of the β-hydroxyalkylamide of Formula XIIA (matting material) described in Example 3a

FIG. 5B: Characteristic XRPD peaks (in degrees 2 theta) of the β-hydroxyalkylamide of Formula XIIA (matting material) described in Example 3a

| Peak No. | Degrees 2 theta ± 0.2 degrees 2 theta | d (Å) |
| --- | --- | --- |
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

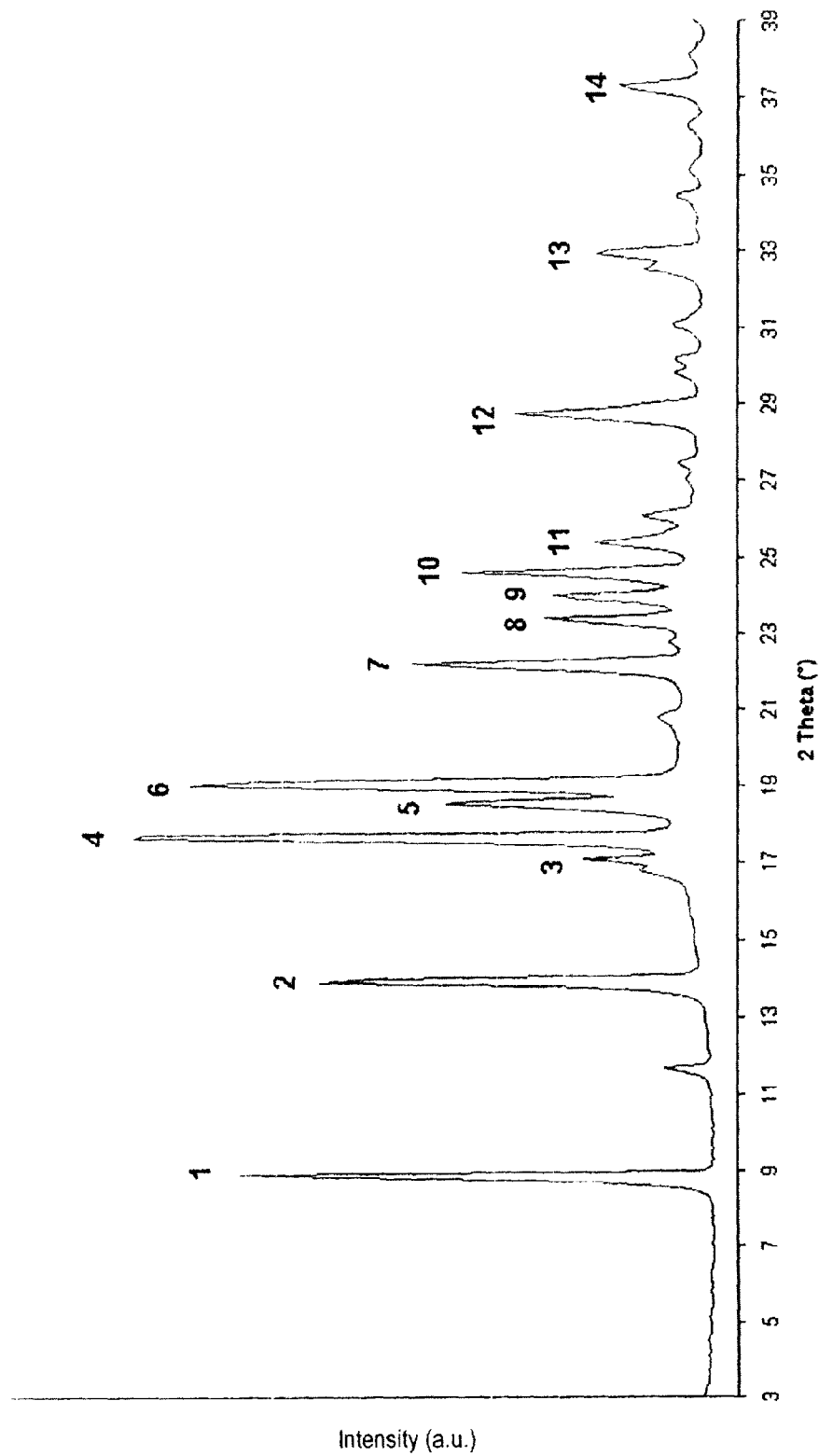
FIG. 6A: XRPD (x-ray powder diffraction) analysis of the β-hydroxyalkylamide (non-matting material) described in Example 4c

FIG. 6B: Characteristic XRPD peaks (in degrees 2 theta) of the β-hydroxyalkylamide (non-matting material) described in Example 4c

| Peak No. | Degrees 2 theta ± 0.2 degrees 2 theta | d (Å) |
|---|---|---|
| 1 | 8.90 | 9.93 |
| 2 | 13.90 | 6.37 |
| 3 | 17.10 | 5.18 |
| 4 | 17.60 | 5.04 |
| 5 | 18.50 | 4.79 |
| 6 | 19.00 | 4.67 |
| 7 | 22.20 | 4.00 |
| 8 | 23.40 | 3.80 |
| 9 | 24.00 | 3.71 |
| 10 | 24.60 | 3.62 |
| 11 | 25.40 | 3.50 |
| 12 | 28.70 | 3.11 |
| 13 | 32.00 | 2.80 |
| 14 | 37.30 | 2.41 |

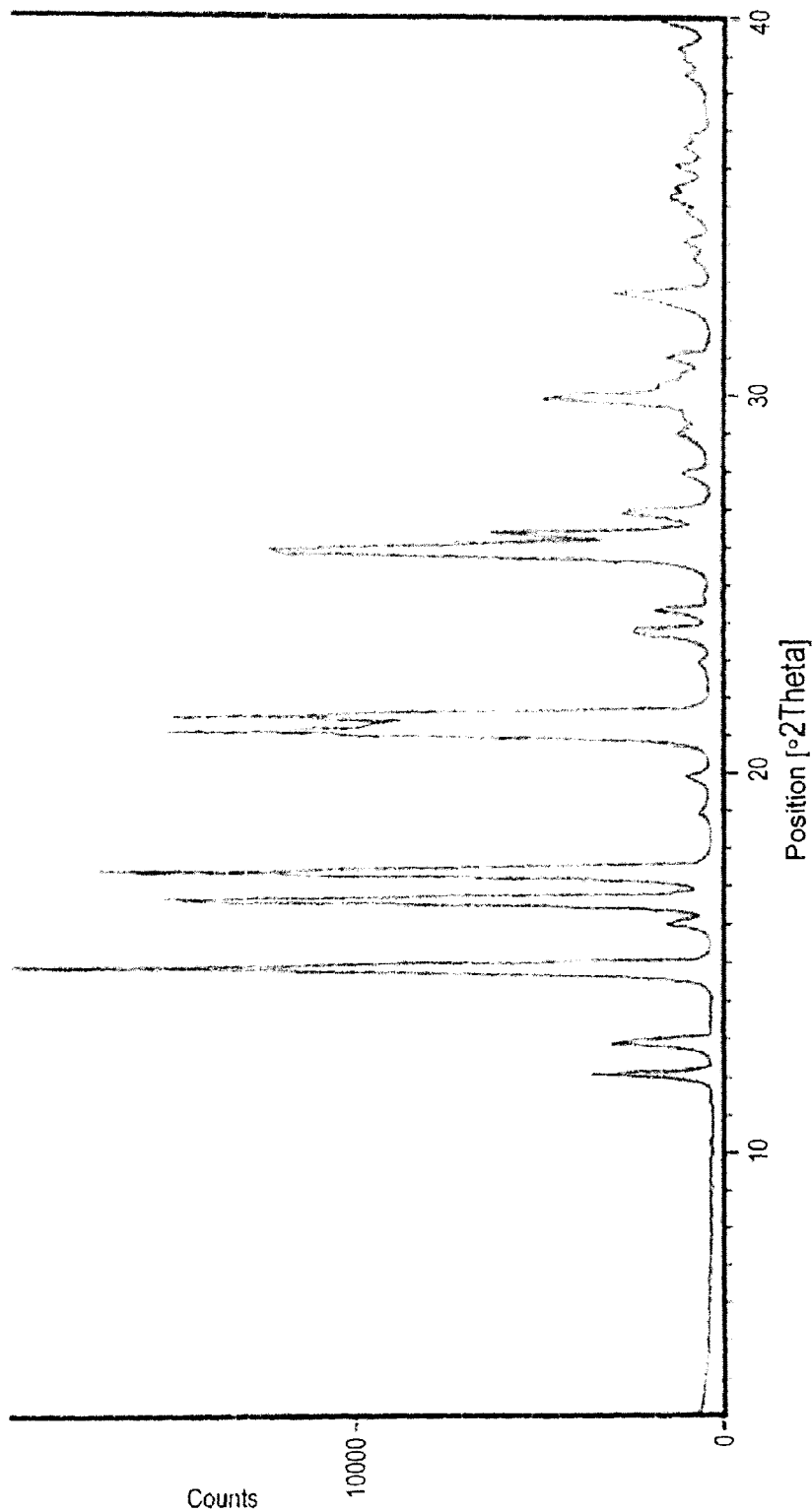
FIG. 7: XRPD (x-ray powder diffraction) analysis of the β-hydroxyalkylamide of Formula XIIA (matting material) described in Example 4b FIG. 8: Ortep plot (50%) with numbering scheme
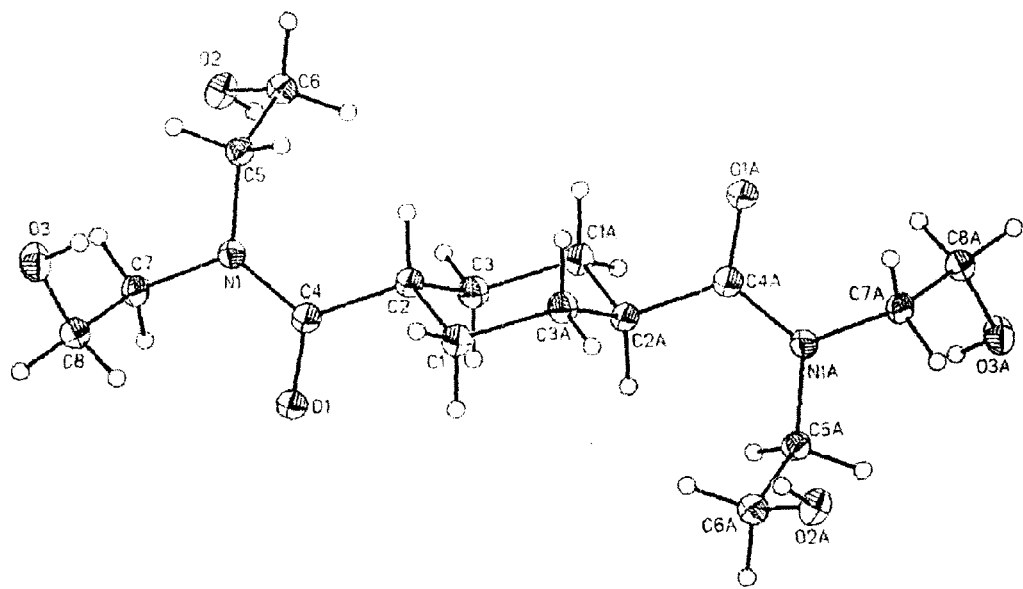

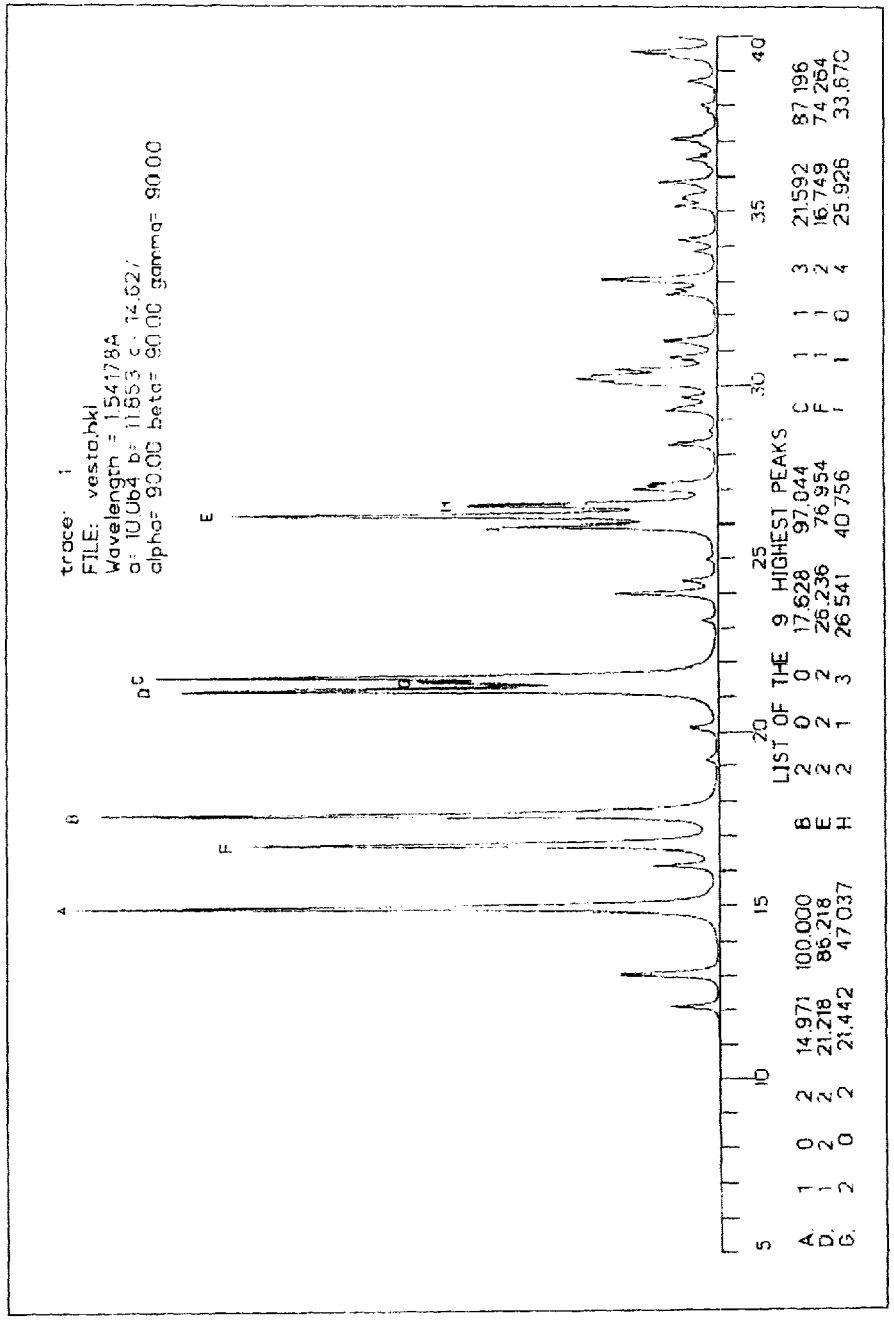
FIG. 9: Calculated powder diffraction diagram based on the single crystal structure determination of N,N,N',N'-tetrakis-(2-hydroxyethyl)cyclohexyl-1,4-diamide (vesta sample)

HEAT-CURING POWDER-LACQUER COMPOSITIONS YIELDING A MATTE SURFACE AFTER CURING OF THE COATING, AS WELL AS A SIMPLE METHOD FOR PRODUCTION OF SAME

The invention relates to heat-curing powder-lacquer compositions exhibiting a matte surface after curing of the coating, as well as to a simple method for production of same.

Thermally curable powder lacquers do not release any organic solvents during application and therefore have clearly ecological advantages compared with liquid lacquers. Thermal cross-linking takes place via polyaddition or polycondensation reactions between the functional groups contained in the binders. Typical binder systems are epoxy resins with curing agents based on amines, amidines, acids, anhydrides; carboxyl polyesters or polyacrylates with curing agents based on epoxides; hydroxyl polyesters or polyacrylates with cross-linking agents on the basis of blocked isocyanates; epoxy-group-containing polyacrylates with dicarboxylic acids as cross-linking agents, carboxyl polyesters or polyacrylates with cross-linking agents on the basis of β-hydroxyalkylamides, etc. The various binder systems differ not only in lacquer-specific properties but also and especially in resistance to outdoor weathering. The pure binder systems usually lead to high-gloss surfaces, with a specular gloss of >80 scale divisions (DIN 67530/ISO 2813, angle of incidence 60°), when they are processed in a one-shot method with only one reaction partner, such as cross-linking agent and resin, and allowed to cure.

Coating systems imparting a uniformly level and matte surface to a substrate command particular interest. The reason is of predominantly practical nature. Glossy surfaces require much more intensive cleaning than do matte surfaces. Furthermore, safety considerations may make it desirable to avoid highly reflective surfaces. Broad sectors of the powder-lacquer industry, such as the architecture, automobile and metal-furniture sectors, are seeing a rising demand for matte (10-30 units) and semi-matte (30-50 units) surfaces, measured as reflectometer values according to DIN 67530/ISO 2813 at an angle of incidence of 60°.

The simplest principle by which a matte surface can be obtained is to admix fillers such as chalk, finely divided silicon dioxide or barium sulfate with the powder lacquer in lower or higher proportions, depending on the desired matte effect. However, such additives lead to deterioration of the lacquer-specific properties, such as adhesion, flexibility, impact resistance and chemical resistance.

The addition of substances incompatible with the lacquer, such as waxes or cellulose derivatives, indeed achieves distinct matting. However, slight changes during extrusion lead to fluctuations in surface gloss and to "fade out" in dark color tones. Reproducibility of the matte effect is not guaranteed.

EP 0698645 describes the creation of matte powder coatings by means of dry mixing (dry blend) of at least two separately manufactured hydroxyalkylamide powder lacquers.

U.S. Pat. No. 3,842,035 therefore proposes to produce matte powder-lacquer coatings by dry blending of finished powder lacquers having sufficiently different reactivities, or in other words powder lacquers having very short and very long gelling times. The binders used are acrylic resins, alkyd resins and preferably epoxy resins.

WO A 89/06674 describes the production of surfaces having a satin gloss or matte appearance by dry blending, or in other words physically mixing finished powder lacquers composed of different binder systems.

DE 2324696 proposes a method for producing matte coatings by use of a special curing agent capable of reacting with epoxy groups, this agent being the salt of cyclic amidines with particular polycarboxylic acids. According to this method, cross-linking of the powder lacquer takes place with different reactivities at various temperatures, whereby microstructures having a matte surface are formed at the surface. The use of this method is restricted to epoxy and carboxyl polyester/epoxy powder lacquers, however, and so coatings having adequate weathering resistance cannot be produced by this method.

EP 366608 also proposes a method for producing powder lacquers having matte surfaces. It relates to powder lacquers based on epoxy resins or epoxy compounds, such as triglycidyl isocyanurate (TGIC) with carboxyl-terminated polyester resins and mixtures of di-, tri- or tetrakis-(β-carboxyethyl) cyclohexanones or cyclopentanones. The matte effect in this case is attributed to the different reactivities between the aliphatic carboxylate groups of the cross-linking agent and the aromatic carboxylate groups of the carboxyl-terminated polyester resin.

Another patent, DE 3232463, describes powder lacquers having matte surfaces and obtained by coextrusion of hydroxyl-terminated polyester resins, epoxy compounds such as TGIC and special reversibly blocked polyisocyanates having free carboxylate groups.

U.S. Pat. No. 4,801,680 (EP 322834) describes a thermally curable powder lacquer comprising a particulate mixture of a carboxylate-group-containing polyester and a β-hydroxyalkylamide. After application on a substrate, this powder lacquer leads to glossy lacquer surfaces. According to Example 2 of U.S. Pat. No. 4,801,680, the lacquer surfaces obtained do not exhibit any impairment of the lacquer surface after having been subjected to an accelerated weathering test using UV irradiation.

EP 520429 describes a resin composition of polyesters having different hydroxyl numbers. The described resin composition necessarily comprises a substantially ungelled polyester A, a substantially ungelled polyester B, tetramethoxymethylglycoluril as curing agent and an organic sulfonic acid as catalyst.

Numerous further publications discuss the possibilities for matting of hydroxyalkylamide powder lacquers. Examples are R. Franiau, "Advances in β-Hydroxyalkylamide Crosslinking Chemistry" ECJ, (2002) 10, pp. 409 ff.; D. Fink, U. Kubilius, "Optimising the Matting of Powder Coatings", Powder Coatings Europe 2002 and R. Guida, "A Novel Approach to Produce Reduced Gloss β-Hydroxyl Alkylamide Powder Coatings" Powder Coating 2002 PCI Conference; D. Beccaria et al. "Modeling Gloss Control in Polyester/β-Hydroxyalkylamide Powder Coatings Based on SPM Structure-Property Relationship" Waterborne, High-Solids and Powder Coatings Symposium, Feb. 26-28, 2003, New Orleans, La., USA.

Korean Unexamined Application KR 10-2009-0111720 (Application Number 10-2008-0037454), whose title is translated as "CYCLOALKANE DICARBOXAMIDE COMPOUNDS, THEIR PREPARATION AND APPLICATION" (see also J. Korean Ind. Eng. Chem., Vol. 20, No. 2, April 2009, 195-200), discloses in Example 1 in particular the compound referred to therein as $N^1,N^1,N^4,N^4$-tetrakis(2-hydroxyethyl)cyclohexane-1,4-dicarboxamide (Formula 3). According to FIG. 2, this compound has only one peak in the DSC analysis, with a maximum peak at approximately 190° C. A cis/trans content of the compound is not mentioned. Furthermore, a comparison is made between carboxyl-group-containing polyesters—which are not precisely defined but are indicated only by broad ranges of some parameters (polyesters not unambiguously characterized and unknown with this viscosity on the market)—which are cross-linked either with this compound or with the known β-hydroxyalkylamides, referred to therein in Example 3 as [$N^1,N^1,N^6,N^6$-tetrakis(2-hydroxyethyl)adipamide] (obtainable as VESTAGON HAA 320 or PRIMID XL 552), or in other words with prior art curing agents that are long-established commercial products and that, as known, lead to glossy surfaces of the manufactured coatings. The sheets are illustrated in FIGS. 3 and 4. The description does not indicate that matte coatings are involved. This would not even be possible, since glossy coatings are obtained with the conventional curing agents.

For matte and semi-matte (<50 gloss units) powder-lacquer compositions containing hydroxyalkylamides, therefore, dry blends represent the state of the art. In other words, two hydroxyalkylamide powder lacquers based on β-hydroxyalkylamides plus resins (polymers) having different acid numbers must be separately produced then added as a dry mixture to the grinding process. This imposes considerable extra time and effort and, if any binder component suffers from deviations, leads to gloss deviations, which require considerable additional time and effort to correct. Furthermore, these dry mixtures separate even in the possession of the end customer, with a resulting shift in gloss, if the powder lacquer is scheduled to be recycled in the usual way.

The object of the invention was to find a heat-curing powder-lacquer composition exhibiting a matte surface after curing of the coating, as well as to find a simple method for production of same.

This object is achieved by the new inventive β-hydroxyalkylamides as cross-linking agents (curing agents) as well as by the inventive method.

BRIEF DESCRIPTION OF THE DRAWINGS

FIG. 1: DSC diagram of the β-hydroxyalkylamide of Formula XIIA described in Example 3a;

FIG. 2: DSC diagram of the β-hydroxyalkylamide of Formula XIIA described in Example 3b:

FIG. 3: DSC diagram of the β-hydroxyalkylamide of Formula XIIA described in Example 4b;

FIG. 4: DSC diagram of the β-hydroxyalkylamide described in Example 4e;

FIG. 5A: XRPD (x-ray powder diffraction) analysis of the β-hydroxyalkylamide of Formula XIIA (matting material) described in Example 3a;

FIG. 5B: Table showing characteristic XRPD peaks (in degrees 2 theta) of the β-hydroxyalkylamide of Formula XIIA (matting material) described in Example 3a;

FIG. 6A: XRPD (x-ray powder diffraction) analysis of the β-hydroxyalkylamide (non-matting material) described in Example 4c;

FIG. 6B: Table showing characteristic XRPD peaks (in degrees 2 theta) of the β-hydroxyalkylamide (non-matting material) described in Example 4c;

FIG. 7: XRPD (x-ray powder diffraction) analysis of the β-hydroxyalkylamide of Formula XIIA (matting material) described in Example 4b;

FIG. 8: Ortep plot (50%) with numbering scheme; and

FIG. 9: Calculated powder diffraction diagram based on the single crystal structure determination of N,N,N',N'-tetrakis-(2-hydroxyethyl)cyclohexyl-(1-1,4-diamide (vesta sample).

Subject matter of the invention is a powder-lacquer composition substantially containing
A) at least one carboxylate-group-containing polymer having an acid number of 5 to 350 mg KOH/g and a glass transition temperature $T_g$ higher than 40° C., and
B) at least one β-hydroxyalkylamide having two or three or four β-hydroxyalkylamide groups per molecule of formula I

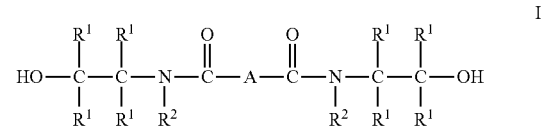

where
$R^1$, $R^2$: independently of one another denote the same or different radicals, selected from alkyl radicals, cycloalkyl radicals, aryl radicals, aralkyl radicals or alkenyl radicals having 1-24 carbon atoms, wherein the radicals may also contain heteroatoms and/or functional groups and wherein $R^1$ may also be hydrogen,
and wherein $R^2$ may also be

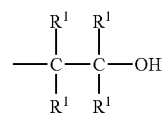

and
A:

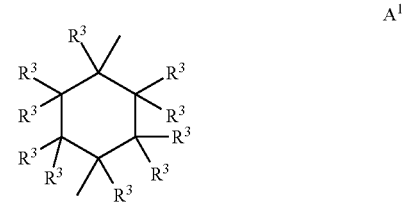

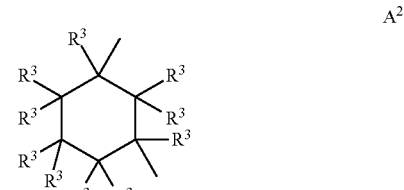

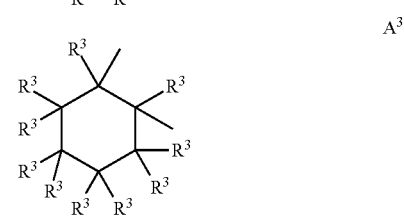

where $R^3$: independently of one another denote the same or different radicals, selected from hydrogen, alkyl radicals, cycloalkyl radicals, aryl radicals, aralkyl radicals or alkenyl radicals having 1-24 carbon atoms, wherein the radicals may also contain heteroatoms and/or functional groups and wherein two or more $R^3$ substituents may be linked to one another to form rings;

wherein the β-hydroxyalkylamides exist in solid form below 150° C.;
C) optional processing aids and/or additives;
wherein the ratio of β-hydroxyalkylamide groups to the carboxylate groups ranges between 0.5:1 and 1.5:1.

Surprisingly, it has been found that, by the use of the new inventive β-hydroxyalkylamides according to formula I as cross-linking agents, it is possible to obtain coatings having matte (10-30 units) and semi-matte (30-50 units) surfaces, measured as reflectometer values according to DIN 67530/ISO 2813 at an angle of incidence of 60°.

Surprisingly, it has been found that, by means of the inventive method in a one-shot working cycle, or in other words by coextrusion of all components, it is possible to obtain the inventive powder-lacquer composition on the basis of carboxylate-group-containing polymers and inventive β-hydroxyalkylamides as cross-linking agents.

Within the scope of this invention, the terms cross-linking agent and curing agent are used synonymously.

There is no need to use, as cross-linking agent, a complex dry mixture (dry blend) of at least two powder lacquers having different reactivities and based on β-hydroxyalkylamides. Furthermore, there is also no need for a polyester mixture or a polyacrylate mixture of at least two resins having different reactivities.

As reaction partners for the β-hydroxyalkylamide compounds used according to the invention for the production of the powder-lacquer composition there can be considered carboxylate-group-containing polymers A). Polymerizates, polycondensates and polyaddition compounds may be used as polymers. In principle, it is possible to use any polymer containing at least two carboxylate groups and having a glass transition temperature $T_g$ above 40° C. Suitable carboxylate-group-containing polymers for the inventive powder lacquers are those having acid numbers of 5-350 mg KOH/g, preferably 15-150 mg KOH/g, and OH numbers <15 mg KOH/g. Preferably these polymers have at least two terminal carboxylate groups.

Within the scope of the invention, carboxylate-group-containing polyesters and/or polyacrylates are particularly preferred.

The carboxylate-group-containing polyesters A) preferably comprise polyester polycarboxylic acids produced from polyols and polycarboxylic acids or derivatives thereof. The glass transition temperature $T_g$ of these acid polyesters ranges from 40 to 80° C., more preferably 40 to 70° C., their acid number varies from 5 to 250 mg KOH/g, preferably from 10 to 150 mg KOH/g, more preferably from 12 to 120 mg KOH/g. The OH numbers are smaller than 15 mg KOH/g. They have an average molecular weight $M_w$ of 1,000 to 10,000 g/mol, preferably 1,500 to 9,000 g/mol, particularly preferably 2,000 to 8,000 g/mol.

The carboxylate-group-containing polyesters to be used according to the invention may be produced by using polycarboxylic acids, such as oxalic, succinic, adipic, 2,2,4(2,4,4)-trimethyladipic, azelaic, sebacic, decanedicarboxylic, dodecanedicarboxylic, fumaric, phthalic, isophthalic, terephthalic, trimellitic, pyromellitic acids. For the acid polyesters, the following polyols, for example, are used: ethylene glycol, 1,2- and 1,3-propanediol, 1,2-, 1,3-, 1,4- and 2,3-butanediol, 1,5-pentanediol, 3-methyl-1,5-pentanediol, neopentylglycol, 1,12-dodecanediol, 2,2,4(2,4,4)-trimethyl-1,6-hexanediol, trimethylolpropane, glycerol, pentaerythritol, 1,4-bishydroxymethylcyclohexane, cyclohexane-1,4-diol, diethylene glycol, triethylene glycol as well as dipropylene glycol. Obviously it is also possible to react hydroxyl-group-containing polyesters produced from polycarboxylic acids and polyols by known methods with polycarboxylic acids and/or polycarboxylic acid anhydrides to obtain the polyester polycarboxylic acids.

The carboxylate-group-containing polyester resins are produced in the known way by esterification or transesterification of dihydric and/or multihydric linear or branched, aliphatic or cycloaliphatic polyols with multibasic, preferably dibasic or multibasic aliphatic, cycloaliphatic or aromatic carboxylic acids or their anhydrides or their esters in the presence of an esterification or transesterification catalyst at temperatures up to approximately 250° C., with reduced pressure near the end.

Preferred polyols are 2,2-dimethyl-1,3-propanediol (neopentyl glycol), ethylene glycol, 1,4-butanediol, 1,6-hexanediol, 1,4-dimethylolcyclohexane, 2,2-[bis(4-hydroxycyclohexyl)]propane, diethylene glycol, dipropylene glycol, glycerol, pentaerythritol, etc. Preferably the polyol component has a high proportion of neopentyl glycol in order to achieve the highest possible glass transition temperature.

Preferred multibasic carboxylic acids are terephthalic acid, isophthalic acid, trimellitic acid, adipic acid and/or 1,4-cyclohexane dicarboxylic acid. The functionality of the preferred carboxylate-group-containing polyester resins is adjusted by means of the ratio of dibasic and higher than dibasic carboxylic acids.

Suitable carboxylate-group-containing acrylate polymers have an acid number of 10-350 mg KOH/g, preferably 20 to 300 mg KOH/g and a glass transition temperature $T_g$ above 40° C., preferably from 45 to 100° C., produced by homopolymerization or copolymerization of a monomer mixture.

The polyacrylate contains carboxylic acid groups and may be a homopolymer or a copolymer.

Usable monomers are acrylic acid and/or methacrylic acid, $C_1$-$C_{40}$ alkyl esters and/or cycloalkyl esters of methacrylic acid and/or acrylic acid, hydroxyalkyl acrylates and/or hydroxyalkyl methacrylates, glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate as well as the analogous amides, while styrene and/or its derivatives may also be present.

Preferably there are used butyl acrylate and/or butyl methacrylate, 2-hydroxyethyl acrylate and/or 2-hydroxyethyl methacrylate, methyl methacrylate, styrene, (meth)acrylic acid and possibly further unsaturated monomers, at least one carboxylate-group-containing monomer being used.

Further suitable monomers are (cyclo)alkyl esters of acrylic or methacrylic acid having 2 to 18 carbon atoms in the (cyclo)alkyl radical. Examples of suitable or preferably suitable monomers are ethyl(meth)acrylate, n-propyl(meth)acrylate, isopropyl(meth)acrylate, n-butyl(meth)acrylate, isobutyl(meth)acrylate, tert-butyl(meth)acrylate, 2-ethylhexyl (meth)acrylate, cyclohexyl methacrylate, neopentyl methacrylate, isobornyl methacrylate, 3,3,5-trimethylcyclohexyl methacrylate and stearyl methacrylate.

Examples of monomers in this regard are styrene, vinyltoluene and ethylstyrene. Examples are acrylic and methacrylic acids, which are also preferably used, as well as crotonic acid, itaconic acid, fumaric acid maleic acid and citraconic acid.

The polyacrylate preferably has an OH number smaller than 10 mg KOH/g, an acid number of 5 to 350 mg KOH/g, preferably 20 to 300 mg KOH/g, particularly preferably 30 to 250 mg KOH/g, a $T_g$ of 40 to 110° C., preferably 45 to 100°

C., an $M_w$ of 500 to 50,000 g/mol, preferably 1,000 to 30,000 g/mol, particularly preferably 1,500 to 20,000 g/mol.

Epoxy resins may also be used as co-cross-linking agents. Examples in this regard are glycidyl ethers and glycidyl esters, aliphatic epoxides, cliglycidyl ethers based on bisphenol A and glycidyl methacrylates. Examples of such epoxides are triglycidyl isocyanurate (examples of TGIC trade names are ARALDITE PT 810, Huntsman; TEPIC G, Nissan; Taida TGIC, Anhui Taida), mixtures of terephthalic acid diglycidyl esters and trimellitic acid triglycidyl esters (examples of trade names are ARALDITE PT 910 and PT 912, Huntsman), glycidyl esters of versatic acid (example of trade name is CARDURA E10, Shell), 3,4-epoxycyclohexylmethyl-3',4'-epoxycyclohexane carboxylate (ECC), diglycidyl ethers based on bisphenol A (example of trade name is EPIKOTE 828, Shell), ethylhexyl glycidyl ethers, butyl glycidyl ethers, pentaerythritol tetraglycidyl ethers (example of trade name is POLYPDX R 16, UPPC AG) as well as other polypox types containing free epoxy groups. Mixtures may also be used. Preferably TEPIC G or ARALDITE PT 910 and 912 are used. Such co-cross-linking agents may be employed in proportions of up to 50 wt % of the curing-agent mixture being used in the form of inventive β-hydroxyalkylamide (matte curing agents) and co-cross-linking agents.

Surprisingly, it has been found that β-hydroxyalkylamides having a cyclohexane ring in the skeleton, with the proviso that the β-hydroxyalkylamides exist in solid form below 150° C., lead to matte surfaces after curing when used as cross-linking agents for carboxyl-group-containing polymers in powder lacquers.

The β-hydroxyalkylamides B) can be produced from various starting materials. A known method is the reaction of β-hydroxyalkylamines with esters of carboxylic acids, the latter generating the basic skeleton (A). Depending on the choice of starting materials, the inventive β-hydroxyalkylamides can be produced in this way.

Alternative but less preferred methods are based on other carboxylic acid derivatives, such as carboxylic acids, carboxylic acid chlorides, carboxylic acid anhydrides or other activated carboxylic acid derivatives as starting materials, which are reacted with β-hydroxyalkylamines. Suitable β-hydroxyalkylamines are such containing alkyl groups having at least 2 to 10 carbon atoms in the hydrocarbon skeleton. The alkyl groups may be linear, branched or even cyclic. Likewise, the alkyl groups may be substituted with hetero atoms, preferably oxygen and nitrogen. Furthermore, these alkyl groups may also contain functional groups, preferably carbonyl groups, carboxyl groups, amino groups, amide groups and urethane groups, and may have an additional alkyl radical on the nitrogen.

In this invention the β-hydroxyalkylamides are preferably produced from N-alkyl-1,2-alkanolamines and/or from N,N-bis-2-hydroxyalkylamines and esters of cyclohexanedicarboxylic acids.

Particularly preferably, there are used β-hydroxyalkylamines of formulas II and/or III Formulas II

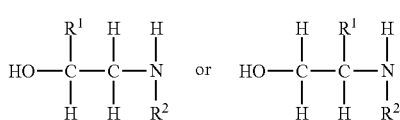

where
$R^1$ denotes hydrogen, methyl, ethyl, propyl,
$R^2$ denotes methyl;

Formulas III

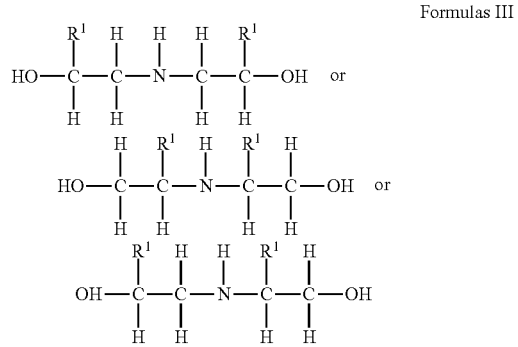

where $R^1$ denotes hydrogen, methyl, ethyl, propyl, either simultaneously or independently of one another.

According to the invention, the following compounds are used particularly preferably as starting materials for production of the β-hydroxyalkylamides: diethanolamine (DEA), diisopropanolamine (DIPA), di-sec-butanolamine, N-methylethanolamine, N-methyl-isopropanolamine.

1,2-, 1,3- and 1,4-Cyclohexanedicarboxylic acid derivatives, especially cyclohexanedicarboxylic acid dialkyl esters, are suitable as starting compounds for substituents A in the inventive β-hydroxyalkylamides. These starting compounds may have any desired cis/trans content.

Preferably there are used compounds of formula IV,

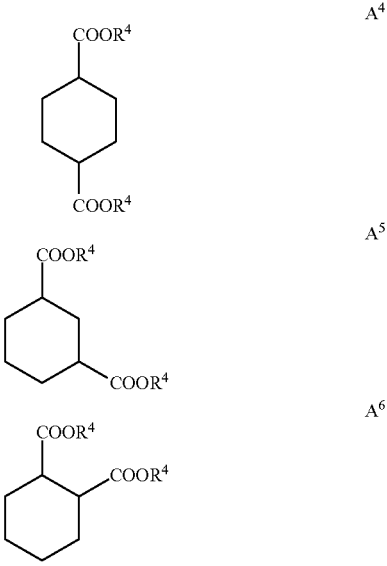

where $R^4$ denotes methyl, ethyl, propyl, butyl simultaneously or independently of one another.

Particularly preferably there are used 1,4-substituted cyclohexanedicarboxylic acid esters, most particularly preferably dimethyl-1,4-cyclohexyl dicarboxylate.

Those β-hydroxyalkylamides of dialkyl-1,4-cyclohexyldicarboxylates, preferably of dimethyl-1,4-cyclohexyldicarboxylate, which are particularly preferred according to the invention have a trans content, relative to the position of the carboxyl groups on the cyclohexyl ring, of greater than or equal to 70 mol %, preferably greater than 80 mol % and particularly preferably greater than 85 mol %. In this connection, dialkyl-1,4-cyclohexyldicarboxylates having any desired trans content may be used for production of the preferred β-hydroxyalkylamides.

The inventive β-hydroxyalkylamides (I) exist in solid form below 150° C., preferably below 170° C., particularly preferably below 180° C.

Particularly preferred inventive β-hydroxyalkylamides have the following formulas:

Formula V

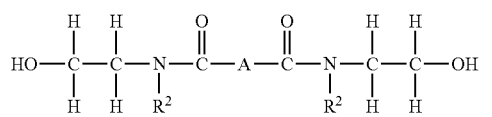

Formula VI

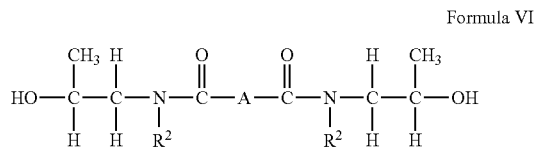

Formula VII

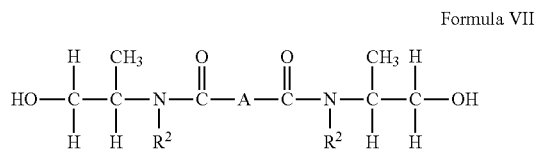

Formula VIII

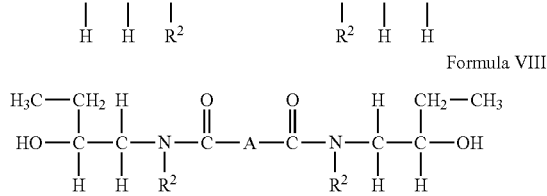

Formula IX

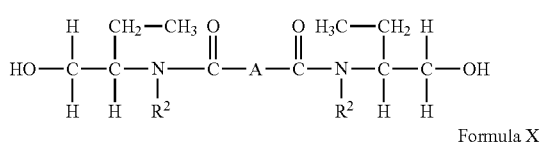

Formula X

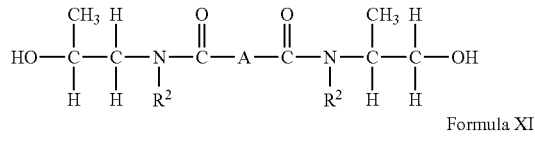

Formula XI

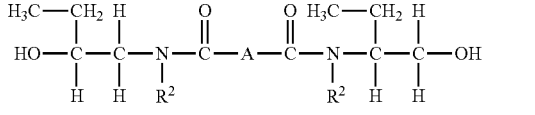

where
$R^2$: methyl,
or

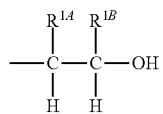

where $R^{1A}$ denotes hydrogen and $R^{1B}$ denotes methyl, ethyl, propyl,
or
where $R^{1A}$ denotes methyl, ethyl, propyl and $R^{1B}$ denotes hydrogen;
and
A: 1,4-disubstituted cyclohexane ring of the formula

wherein the trans content of A is ≧70 mol %;
and wherein the β-hydroxyalkylamides exist in solid form below 150° C.

That β-hydroxyalkylamide of dimethyl-1,4-cyclohexyldicarboxylate and diethanolamine which is particularly preferred according to the invention and has four β-hydroxyalkylamide groups per molecule according to formula XII Formula XII

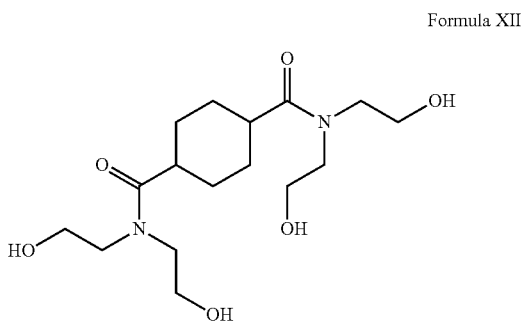 [SMILES: O=C(C1CCC(C(=O)N(CCO)CCO)CC1)N(CCO)CCO]

has a trans content on the cyclohexyl ring of greater than or equal to 70 mol %, preferably greater than 80 mol % and particularly preferably greater than 85 mol %.

To achieve good lacquer-specific properties of the powder-lacquer composition, the ratio of β-hydroxyalkylamide groups to the carboxylate groups of the carboxylate-group-containing polymers preferably ranges between 0.1 and 1.5:1, particularly preferably between 0.8 and 1.2:1.

Processing aids and additives C) that are customary in powder-lacquer technology, such as leveling agents, for example polysilicones or acrylates, light stabilizers, for example sterically hindered amines and/or absorbers, degassing agents (for example benzophenone), modified phenol resins, catalysts and/or other auxiliary materials, such as described, for example, in EP 669353, may be added to the powder-lacquer composition in a total proportion of 0.1 to 10 wt %. Fillers and pigments such as titanium dioxide may be added in a proportion of up to 50 wt % of the total composition.

The powder-lacquer compositions contain the following components in the weight proportions shown:

|  | Wt % |
|---|---|
| Inventive β-hydroxyalkylamide (matte curing agent) B) | 0.5 to 20 |
| preferably | 1 to 15 |
| Optional HAA curing agent | 0 to 10 |
| preferably | 0 to 8 |

-continued

| | Wt % |
|---|---|
| Carboxylate-group-containing polymers A) | 35 to 96 |
| preferably | 50 to 80 |
| Optional co-cross-linking agents | 0 to 5 |
| preferably | 0 to 3 |
| Additives, fillers, pigments, etc. C) | 0.1 to 50 |
| preferably | 5 to 40 |

In the storage test according to DIN EN ISO 8130-8, which is standard for powder lacquers, the inventive powder-lacquer compositions exhibit good storage stability at temperatures of 30±1 and 40±1° C. and can be stored for >30 days.

In the particularly preferred embodiment of the invention, the inventive powder-lacquer compositions contain the following components:

At least one carboxylate-group-containing polyester having an acid number of 15 to 150 mg KOH/g and a glass transition temperature of at least 40° C., At least one inventive β-hydroxyalkylamide having at least two or more, preferably four β-hydroxyalkylamide groups, or else mixtures thereof with the same and/or different functionality, And, if necessary, further additives and processing aids customary for powder lacquers, such as wetting, leveling or degassing agents, heat or UV stabilizers, pigments, dyes, fillers, co-cross-linking agents.

Subject matter of the invention is a method for production of a powder-lacquer composition substantially containing A) at least one carboxylate-group-containing polymer having an acid number of 5 to 250 mg KOH/g and a glass transition temperature $T_g$ higher than 40° C., and B) at least one β-hydroxyalkylamide having two or three or four β-hydroxyalkylamide groups per molecule of formula I

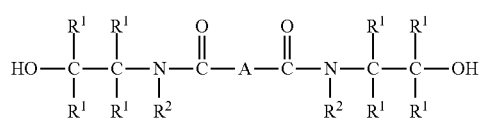

where $R^1$, $R^2$: independently of one another denote the same or different radicals, selected from alkyl radicals, cycloalkyl radicals, aryl radicals, aralkyl radicals or alkenyl radicals having 1-24 carbon atoms, wherein the radicals may also contain heteroatoms and/or functional groups and wherein $R^1$ may also be hydrogen and wherein $R^2$ may also be

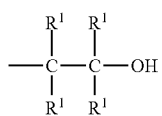

and A:

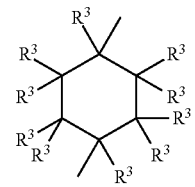

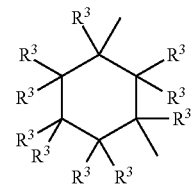

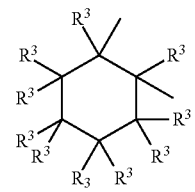

where $R^3$: independently of one another denote the same or different radicals, selected from hydrogen, alkyl radicals, cycloalkyl radicals, aryl radicals, aralkyl radicals or alkenyl radicals having 1-24 carbon atoms, wherein the radicals may also contain heteroatoms and/or functional groups and wherein two or more $R^3$ substituents may be linked to one another to form rings;

wherein the p-hydroxyalkylamides exist in solid form below 150° C.;

C) optional processing aids and/or additives;

wherein the ratio of β-hydroxyalkylamide groups to the carboxylate groups ranges between 0.5:1 and 1.5:1;

in the molten state by coextrusion of all components at temperatures between 80 and 150° C.

Subject matter of the invention is also a method for producing a powder lacquer composition, wherein N,N,N',N'-tetrakis-(2-hydroxyethyl)cyclohexyl-1,4-diamide in accordance with Formula XIIA is contained as component B),

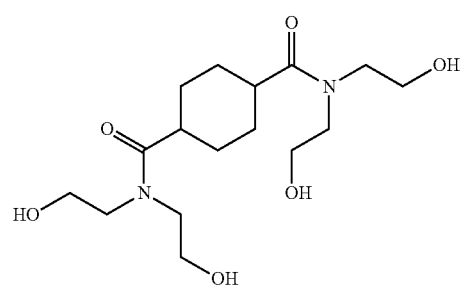

wherein this has the following parameters:
1. a trans content on the cyclohexyl ring of greater than or equal to 70 mol % relative to the total proportion of all isomers of N,N,N',N'-tetrakis-(2-hydroxyethyl)cyclohexyl-1,4-diamide that are present, and 2. two endothermic peaks according to DSC analysis (differential scanning calorimetry), peak 1 being situated in the range of 140-170° C. with a maximum of 155-165° C., and peak 2 being situated in the range of 170-210° C. with a maximum of 175-207° C., and 3. the ratio of the enthalpies of endothermic peak 1 to endothermic peak 2 is 1:1 to 1:5, and 4. the XRPD spectrum of the powder sample in the x-ray diffractometer measured with Cu Kα radiation (1.541 Å) exhibits the following peaks:

| Peak No. | Degrees 2 theta ± 0.2 degrees 2 theta | d (Å) |
|---|---|---|
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

Subject matter of the invention is also a method for producing a powder lacquer composition, wherein N,N,N',N'-tetrakis-(2-hydroxyethyl)cyclohexyl-1,4-diamide in accordance with Formula XIIA is contained as component B),

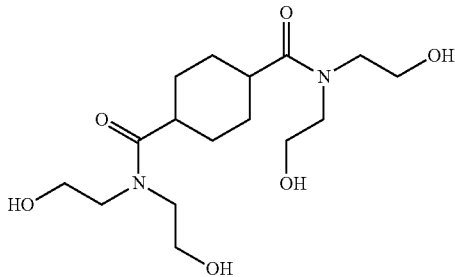

XIIA wherein this has the following parameters:

1. a trans content on the cyclohexyl ring of greater than or equal to 70 mol % relative to the total proportion of all isomers of N,N,N',N'-tetrakis-(2-hydroxyethyl)cyclohexyl-1,4-diamide that are present, and 2. two endothermic peaks according to DSC analysis (differential scanning calorimetry), peak 1 being situated in the range of 140-170° C. with a maximum of 155-165° C., and peak 2 being situated in the range of 170-210° C. with a maximum of 175-207° C., and 3. the ratio of the enthalpies of endothermic peak 1 to endothermic peak 2 is 1:1 to 1:5, and 4. the XRPD spectrum of the powder sample in the x-ray diffractometer measured with Cu Kα radiation (1.541 Å) exhibits the following peaks:

| Peak No. | Degrees 2 theta ± 0.2 degrees 2 theta | d (Å) |
|---|---|---|
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

5. and wherein this has, according to x-ray structure analysis of a single crystal, the following parameters:

| | | |
|---|---|---|
| Crystal system | Orthorhombic | |
| Space group: | Pbca | |
| Unit cell dimensions: | a = 10.06350(10) | α = 90°, |
| | b = 11.85290(10) Å | β = 90°, |
| | c = 14.6275(2) Å | γ = 90°, |
| Volume: | 1744.79(3) Å$^3$ | |

The inventive powder-lacquer compositions are more preferably produced in the molten state by coextrusion of all components A) to C) at temperatures between 80 and 150° C. The extrudate is then cooled, ground and sieved or classified to a grain size of <120 μm, preferably <100 μm. The thermally curable and toxicologically safe powder-lacquer composition produced according to the invention therefore comprises a matrix obtained by coextrusion of all components.

To achieve the inventive effect, namely the formation of matte surfaces with a specular gloss according to DIN 67530/ISO 2813 of <50 at an angle of incidence of 60°, it is possible to use numerous carboxylate-group-containing polymers, especially carboxyl-group-terminated polyesters or polyacrylates, which differ in functionality and reactivity. Via the chosen binder partners (polyesters) in conjunction with the inventive hydroxyalkylamides, therefore, the desired gloss may be selected within a considerable bandwidth (Examples: 1-7) in otherwise the same formulation. Example (8) containing polyacrylate differs therefrom, since more cross-linking agent is needed for the higher acid number and less pigmentation was chosen in view of the expected greater brittleness.

The powder lacquers for producing coatings are used and applied by methods standard for powder lacquers, preferably by means of an electrostatic powder-lacquer spraying machine using the triboelectric or corona method or the fluidized-bed method.

At normal ambient temperatures, the powder-lacquer compositions produced according to the invention have good storage stability and, after cross-linking between 150 and 220° C., exhibit good lacquer-specific properties, optically well flowing surfaces and the described low specular gloss.

In contrast to the prior art, the inventive powder-lacquer compositions yield coatings with optically very beautiful, well flowing surfaces (PCI Rating Tables 8-10), which are nevertheless matte (10-30 units) and/or semi-matte (30-50 units), measured as reflectometer values according to DIN 67530/ISO 2813 at an angle of incidence of 60°, without the need for either a dry mixture (dry blend) or a polyester mixture or a polyacrylate mixture (one-shot blend).

Above and beyond this variation, the possibility additionally exists that the reflectometer value, measured according to DIN 67530/ISO 2813 at an angle of incidence of 60°, could be shifted to higher values until high gloss in excess of 80 scale divisions at an angle of 60° is restored. This is achieved by partial replacement of the inventive matte curing agent B) by a commercially available β-hydroxyalkylamide having two or more than two β-hydroxyalkylamide groups of mixtures thereof having different functionalities.

Subject matter of the invention is the use of a powder-lacquer composition substantially containing A) at least one carboxylate-group-containing polymer having an acid number of 5 to 350 mg KOH/g and a glass transition temperature $T_g$ higher than 40° C., and B) at least one β-hydroxyalkylamide having two or three or four β-hydroxyalkylamide groups per molecule of formula I

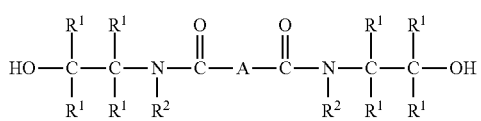

where
$R^1$, $R^2$: independently of one another denote the same or different radicals, selected from alkyl radicals, cycloalkyl radicals, aryl radicals, aralkyl radicals or alkenyl radicals having 1-24 carbon atoms, wherein the radicals may also contain heteroatoms and/or functional groups and wherein $R^1$ may also be hydrogen
and wherein $R^2$ may also be

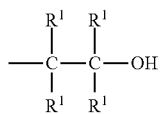

and
A:

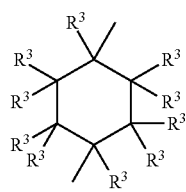   $A^1$

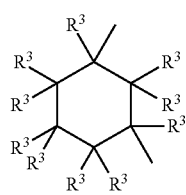   $A^2$

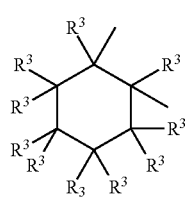   $A^3$ where $R^3$: independently of one another denote the same or different radicals, selected from hydrogen, alkyl radicals, cycloalkyl radicals, aryl radicals, aralkyl radicals or alkenyl radicals having 1-24 carbon atoms, wherein the radicals may also contain heteroatoms and/or functional groups and wherein two or more $R^3$ substituents may be linked to one another to form rings;
wherein the β-hydroxyalkylamides exist in solid form below 150° C.;

C) optional processing aids and/or additives;
wherein the ratio of β-hydroxyalkylamide groups to the carboxylate groups ranges between 0.5:1 and 1.5:1;
for the production of coatings having matte surfaces, with a specular gloss according to DIN 67530/ISO 2813 of <50 at an angle of incidence of 60°.

Most particularly preferred subject matter of the invention is a powder lacquer composition, which contains the compound N,N,N',N'-tetrakis-(2-hydroxyethyl)cyclohexyl-1,4-diamide in accordance with Formula XIIA as component B),

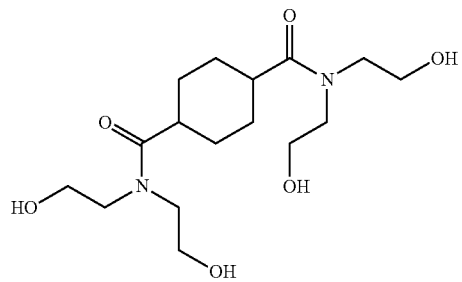   XIIA wherein this has the following parameters:
1. a trans content on the cyclohexyl ring of greater than or equal to 70 mol % relative to the total proportion of all isomers of N,N,N',N'-tetrakis-(2-hydroxyethyl)cyclohexyl-1,4-diamide that are present, and
2. two endothermic peaks according to DSC analysis (differential scanning calorimetry), peak 1 being situated in the range of 140-170° C. with a maximum of 155-165° C., and peak 2 being situated in the range of 170-210° C. with a maximum of 175-207° C., and
3. the ratio of the enthalpies of endothermic peak 1 to endothermic peak 2 is 1:1 to 1:5, and
4. the XRPD spectrum of the powder sample in the x-ray diffractometer measured with Cu Kα radiation (1.541 Å) exhibits the following peaks:

| Peak No. | Degrees 2 theta ± 0.2 degrees 2 theta | d (Å) |
| --- | --- | --- |
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

Description of the Particularly Preferred Component B):

Particularly preferred subject matter of the invention is a powder lacquer composition, wherein the β-hydroxyalkylamide N,N,N',N'-tetrakis-(2-hydroxyethyl)cyclohexyl-1,4-diamide in accordance with Formula XIIA is contained as component B), with a trans content on the cyclohexyl ring of greater than or equal to 70 mol %, preferably greater than 80 mol % and particularly preferably greater than 85 mol % relative to the total proportion of all isomers of N,N,N',N'-tetrakis-(2-hydroxyethyl)cyclohexyl-1,4-diamide that are present. In addition, this 3-hydroxyalkylamide N,N,N',N'-tetrakis-(2-hydroxyethyl)cyclohexyl-1,4-diamide in accordance with Formula XIIA, used according to the invention as component B), has two endothermic peaks according to DSC analysis (differential scanning calorimetry): firstly is a peak with a maximum (peak 1) of approximately 160° C. and a further second peak with a maximum (peak 2) of approximately 190° C.—see the figures for the Examples. Preferably the first peak is situated in the range of 140-170° C. with a maximum of 155-165° C., and the second peak is situated in the range of 170-210° C. with a maximum of 175-207° C. Particularly preferably the first peak is situated in the range of 155-170° C. with a maximum of 158-165° C., and the second peak is situated in the range of 170-210° C. with a maximum of 180-205° C.

The ratio of the enthalpies of endothermic peak 1 (~160° C.) to endothermic peak 2 (~190° C.) can be 1:1 to 1:5, preferably 1:1 to 1:3.

The DSC measurements were carried out according to DIN EN ISO 11357-1 of March 2010. A heat-flow differential calorimeter manufactured by Mettler-Toledo, Model DSC 821, was used. The samples were heated one time from −30° C. to 250° C. at 10 K/min.

The XRPD measurements of powder samples were carried out in an x-ray diffractometer with Cu Kα radiation (1.541 Å). According to FIG. 9, the following significant and characteristic 6 peaks are found for the β-hydroxyalkylamide N,N,N',N'-tetrakis-(2-hydroxyethyl)cyclohexyl-1,4-diamide in accordance with Formula XIIA

| Peak No. | Degrees 2 theta ± 0.2 degrees 2 theta | d (Å) |
| --- | --- | --- |
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

Most particularly preferred as component B) is the β-hydroxyalkylamide N,N,N',N'-tetrakis-(2-hydroxyethyl)cyclohexyl-1,4-diamide in accordance with Formula XIIA, with a trans content on the cyclohexyl ring of greater than or equal to 92 mol %, preferably greater than 94 mol %, particularly preferably greater than 96 mol % and most particularly preferably greater than 98 mol % relative to the total proportion of all isomers of N,N,N',N'-tetrakis-(2-hydroxyethyl)cyclohexyl-1,4-diamide that are present.

The β-hydroxyalkylamide of Formula XIIA used according to the invention as component B) exists in solid form below 175° C., preferably below 180° C. and particularly preferably below 185° C.

The β-hydroxyalkylamide of Formula XIIA used according to the invention as component B) with features 1. to 4. was investigated by an x-ray structure analysis of a single crystal. Detailed particulars of the measurement are summarized in Appendix 1. The x-ray structure analysis of a single crystal yielded the following result for the structure:

| Crystal system | Orthorhombic | |
| --- | --- | --- |
| Space group: | Pbca | |
| Unit cell dimensions: | a = 10.06350(10) Å | α = 90°, |
| | b = 11.85290(10) Å | β = 90°, |
| | c = 14.6275(2) Å | γ = 90°, |
| Volume: | 1744.79(3) Å³ | |

The numbers in parentheses indicate the measurement accuracy respectively in plus and minus for the corresponding last digit or last two digits.

Most particularly preferred subject matter of the invention is a powder lacquer composition, which contains the compound N,N,N',N'-tetrakis-(2-hydroxyethyl)cyclohexyl-1,4-diamide in accordance with Formula XIIA as component B),

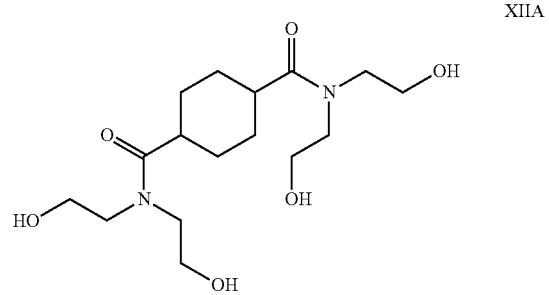 [SMILES: O=C(C1CCC(C(=O)N(CCO)CCO)CC1)N(CCO)CCO]

XIIA wherein this has the following parameters:
1. a trans content on the cyclohexyl ring of greater than or equal to 70 mol % relative to the total proportion of all isomers of N,N,N',N'-tetrakis-(2-hydroxyethyl)cyclohexyl-1,4-diamide that are present,
and
2. two endothermic peaks according to DSC analysis (differential scanning calorimetry), peak 1 being situated in the range of 140-170° C. with a maximum of 155-165° C., and peak 2 being situated in the range of 170-210° C. with a maximum of 175-207° C.,
and
3. the ratio of the enthalpies of endothermic peak 1 to endothermic peak 2 is 1:1 to 1:5,
and
4. the XRPD spectrum of the powder sample in the x-ray diffractometer measured with Cu Kα radiation (1.541 Å) exhibits the following peaks:

| Peak No. | Degrees 2 theta ± 0.2 degrees 2 theta | d (Å) |
| --- | --- | --- |
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

5. and wherein this has, according to x-ray structure analysis of a single crystal, the following parameters:

| Crystal system | Orthorhombic | |
|---|---|---|
| Space group: | Pbca | |
| Unit cell dimensions: | a = 10.06350(10) Å | α = 90°, |
| | b = 11.85290(10) Å | β = 90°, |
| | c = 14.6275(2) Å | γ = 90°, |
| Volume: | 1744.79(3) Å³ | |

Production

The particularly preferred N,N,N',N'-tetrakis-(2-hydroxyethyl)cyclohexyl-1,4-diamide in accordance with Formula XIIA used as component B) can be obtained by various methods:

Firstly, as described in detail hereinabove, the N,N,N',N'-tetrakis-(2-hydroxyethyl)cyclohexyl-1,4-diamide in accordance with Formula XIIA is produced in an extruder, intensive kneader, intensive mixer or static mixer, preferably in an extruder, preferably without solvent. In this process, temperatures of 100 to 180° C. are used. This is followed by recrystallization from a suitable solvent, preferably water. After dissolution at temperatures of 20-100° C. and crystallization, the N,N,N',N'-tetrakis-(2-hydroxyethyl)cyclohexyl-1,4-diamide in accordance with Formula XIIA having the aforesaid parameters is obtained. This can then be washed with alcohols, preferably methanol, and dried. Preferably drying takes place at temperatures of 20-90° C., and it may also take place under vacuum.

A further variant of production is achieved as described in detail hereinabove, by the fact that the N,N,N',N-tetrakis-(2-hydroxyethyl)cyclohexyl-1,4-diamide in accordance with Formula XIIA is produced in an extruder, intensive kneader, intensive mixer or static mixer, preferably in an extruder, preferably without solvent. In this process, temperatures of 100 to 180° C. are used. This is followed by heat treatment at temperatures of 50-100° C., preferably at temperatures of 70-85° C. The duration amounts to longer than 6 hours, preferably longer than 12 hours. The heat treatment may take place under vacuum.

The particularly preferred N,N,N',N'-tetrakis-(2-hydroxyethyl)cyclohexyl-1,4-diamide in accordance with Formula XIIA used as component B) may also take place discontinuously in the solvent, or in other words in a batch method. The reaction is carried out in standard reactors. This operation may take place without pressure, using a reflux condenser, or under pressure in a closed reactor.

The synthesis is carried out in a solvent, preferably in alcohols, preferably methanol. The added proportion of solvent is greater than 10 wt %, preferably greater than 15 wt % relative to the total amount of all educts (starting materials) used. This operation may take place under reflux, or else even at relatively low temperatures as well as relatively high temperatures, under pressure.

Production takes place at temperatures of 20 to 120° C., preferably at 60 to 90° C., particularly preferably at 70 to 85° C.

After crystallization, the N,N,N',N'-tetrakis-(2-hydroxyethyl)cyclohexyl-1,4-diamide in accordance with Formula XIIA having the aforesaid parameters is obtained.

Moreover, the production of the N,N,N',N'-tetrakis-(2-hydroxyethyl)cyclohexyl-1,4-diamide in accordance with Formula XIIA can be achieved in closed apparatuses under pressure at temperatures of 60 to 140° C. without addition of solvents.

The N,N,N',N'-tetrakis-(2-hydroxyethyl)cyclohexyl-1,4-diamide in accordance with Formula XIIA, produced in this way in a batch process, can be recrystallized from suitable solvents, preferably from water or alcohols, preferably from methanol.

Moreover, the production of the N,N,N',N'-tetrakis-(2-hydroxyethyl)cyclohexyl-1,4-diamide in accordance with Formula XIIA can also be achieved discontinuously without solvents. The reaction is carried out in standard reactors. This operation may take place using a reflux condenser. Preferably production takes place at temperatures of 20 to 140° C., preferably 60 to 90° C., particularly preferably 70 to 85° C. The β-hydroxyalkylamide obtained in this way in a batch process is then recrystallized from suitable solvents, preferably from water or alcohols, preferably from methanol. After crystallization, the N,N,N',N'-tetrakis-(2-hydroxyethyl)cyclohexyl-1,4-diamide in accordance with Formula XIIA having the aforesaid parameters is obtained.

The concentration of all isomers of the N,N,N',N'-tetrakis-(2-hydroxyethyl)cyclohexyl-1,4-diamide in the end product after its production is 75 mass %, preferably 80 mass % and particularly preferably 85 mass %.

As it has been possible to show in the Examples, this β-hydroxyalkylamide N,N,N',N'-tetrakis-(2-hydroxyethyl)cyclohexyl-1,4-diamide of Formula XIIA, as described and characterized here, achieves intensive matting in powder lacquers with a gloss of less than 50 scale divisions at an angle of 60°. This product of Formula XIIA therefore differs unequivocally from the β-hydroxyalkylamide disclosed according to Korean Unexamined Application KR10-2009-0111720 (and from the β-hydroxyalkylamide in Korean Ind. Eng. Chem., Vol. 20, No. 2, April 2009, 195-200), as proved therein in FIG. 2 on page 15, which exhibits only one peak at approximately 190° C. in DSC analysis and, as Comparison Example 4c shows, does not lead to coatings with matte surfaces.

Subject matter of the invention is also the use of a powder lacquer composition as described hereinabove, wherein N,N,N',N'-tetrakis-(2-hydroxyethyl)cyclohexyl-1,4-diamide in accordance with Formula XIIA is contained as the component,

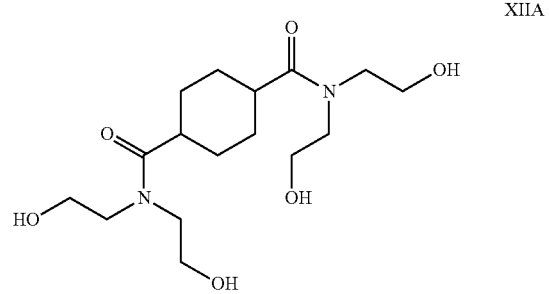 [SMILES: O=C(C1CCC(C(=O)N(CCO)CCO)CC1)N(CCO)CCO]

wherein this has the following parameters:
1. a trans content on the cyclohexyl ring of greater than or equal to 70 mol % relative to the total proportion of all isomers of N,N,N',N'-tetrakis-(2-hydroxyethyl)cyclohexyl-1,4-diamide that are present, and
2. two endothermic peaks according to DSC analysis (differential scanning calorimetry), peak 1 being situated in the range of 140-170° C. with a maximum of 155-165°

C., and peak 2 being situated in the range of 170-210° C. with a maximum of 175-207° C., and 3. the ratio of the enthalpies of endothermic peak 1 to endothermic peak 2 is 1:1 to 1:5, and 4. the XRPD spectrum of the powder sample in the x-ray diffractometer measured with Cu Kα radiation (1.541 Å) exhibits the following peaks:

| Peak No. | Degrees 2 theta ± 0.2 degrees 2 theta | d (Å) |
|---|---|---|
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 | for the production of coatings having matte surfaces, with a gloss of <50 units, measured as reflectometer values according to DIN 67530/ISO 2813 at an angle of incidence of 60°.

Subject matter of the invention is also the use of a powder lacquer composition such as described hereinabove, wherein N,N,N',N'-tetrakis-(2-hydroxyethyl)cyclohexyl-1,4-diamide in accordance with Formula XIIA is contained as component B),

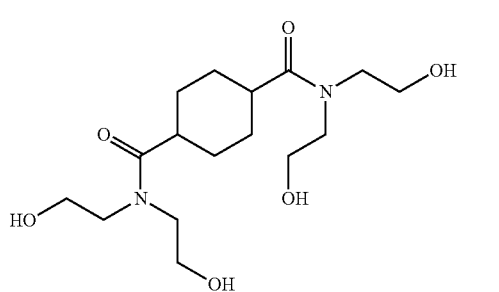

XIIA wherein this has the following parameters:

1. a trans content on the cyclohexyl ring of greater than or equal to 70 mol % relative to the total proportion of all isomers of N,N,N',N'-tetrakis-(2-hydroxyethyl)cyclohexyl-1,4-diamide that are present, and 2. two endothermic peaks according to DSC analysis (differential scanning calorimetry), peak 1 being situated in the range of 140-170° C. with a maximum of 155-165° C., and peak 2 being situated in the range of 170-210° C. with a maximum of 175-207° C., and 3. the ratio of the enthalpies of endothermic peak 1 to endothermic peak 2 is 1:1 to 1:5, and 4. the XRPD spectrum of the powder sample in the x-ray diffractometer measured with Cu Kα radiation (1.541 Å) exhibits the following peaks:

| Peak No. | Degrees 2 theta ± 0.2 degrees 2 theta | d (Å) |
|---|---|---|
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

5. and wherein this has, according to x-ray structure analysis of a single crystal, the following parameters:

| | | |
|---|---|---|
| Crystal system | Orthorhombic | |
| Space group: | Pbca | |
| Unit cell dimensions: | a = 10.06350(10) Å | α = 90°, |
| | b = 11.85290(10) Å | β = 90°, |
| | c = 14.6275(2) Å | γ = 90°, |
| Volume: | 1744.79(3) Å$^3$ | | for the production of coatings having matte surfaces, with a gloss of <50 units, measured as reflectometer values according to DIN 67530/ISO 2813 at an angle of incidence of 60°.

EXAMPLES

The following examples and Tables 1, 2 and 3 characterize the compositions of the coating system and the properties of the respective coating after it has been applied and cured.

Starting Materials:

1) β-Hydroxyalkylamide a) β-Hydroxyalkylamide (matte curing agent) based on 1,4-cyclohexanedicarboxylic acid and diethanolamine having four β-hydroxyalkylamide groups per molecule as in Formula XII has a trans content on the cyclohexyl ring of >90% (Evonik Degussa GmbH, Germany).

| | | |
|---|---|---|
| Trans-N,N,N',N'-tetrakis-(2-hydroxyethyl)cyclohexyl-1,4-diamide[1] | Mass % | 95.30 |
| Cis-N,N,N',N'-tetrakis-(2-hydroxyethyl)cyclohexyl-1,4-diamide[1] | Mass % | 0.28 |
| Σ N,N,N',N'-tetrakis-(2-hydroxyethyl)cyclohexyl-1,4-diamide[1] | Mass % | 95.58 |
| DEA[1] | Mass % | 0.18 |
| OH number | mg KOH/g | 616 |
| Base number | mg KOH/g | 3 |
| Melting range | ° C. | 194-201 |

[1]Analytical values by GC
OH number: DIN 53240
Base number: DIN 53176
Melting range: DIN EN ISO 3146 b) VESTAGON® HA 320, OH number: 660-740 mg KOH/g, melting range: 115-130° C. (Evonik Degussa GmbH, Germany)

2) Carboxylate-Group-Containing Polymer Resins
   a) Amorphous polyesters:

| | | | |
|---|---|---|---|
| Crylcoat ® 2617-3, | Acid number: 33 mg KOH/g, | Tg: 61° C., | (Cytec Inc., USA) |
| Crylcoat ® 2618-3, | Acid number: 35 mg KOH/g, | Tg: 61° C., | (Cytec Inc., USA) |
| Crylcoat ® E 36988, | Acid number: 30 mg KOH/g, | Tg: 54° C., | (Cytec Inc., USA) |
| Uralac ® P 800, | Acid number: 28 mg KOH/g, | Tg: 61° C., | (DSM Resins B.V., NL) |
| Uralac ® P 865, | Acid number: 35 mg KOH/g, | Tg: 56° C., | (DSM Resins B.V., NL) |
| Pulverol ® 8120, | Acid number: 33 mg KOH/g, | Tg: 60° C., | (Neochimiki LV s.a., GR) |
| Pulverol ® 8123, | Acid number: 33 mg KOH/g, | Tg: 60° C., | (Neochimiki LV s.a., GR) | b) Polyacrylate

| | | | |
|---|---|---|---|
| Joncryl ® 819, | Acid number: 75 mg KOH/g, | Tg: 57° C., | (BASF AG, Germany) |

3) Co-Cross-Linking Agents
   a) Triglycidyl isocyanurate
      TEPIC®G, Epoxy equiv.: <110 g/Eq, Melting range: 90-125° C., (Nissan Chemical Ind. Ltd., Japan)
4) Further Formulation Components:
   Kronos® 2160 titanium dioxide (Kronos Titan GmbH, Germany),
   Resiflow® PV 88 (Worlée-Chemie GmbH, Germany),
   Benzoin (Merck-Schuchard, Germany).

Powder Lacquer and Coating

The powder lacquer was produced firstly by mixing all components according to Tables 1 and 2 at room temperature in an MIT mixer at 500 rpm for 120 seconds and secondly by coextruding the molten mixture at a temperature (housing) of 90° C. (charge temperature approximately 130° C.). The stoichiometric ratio of acid groups of the polyester or polyacrylate to OH groups of the β-hydroxyalkylamides (curing agent) was approximately 1:1. When co-cross-linking agents were used, they were considered to be a stoichiometric part of the curing agent.

The extrudate was then cooled, ground and sieved to a grain size of <100 μm. The powder lacquer produced in this way was applied with an electrostatic powder-spraying machine at 60 kV onto degreased steel sheets (deep-drawn steel of the Krüppel Co., 210×70×0.8 mm) and/or aluminum sheets (Q-panel AL-36 5005 H 14/08 0.8 mm) and baked between 160 and 220° C. in a circulating-air drying oven. The cured lacquer films exhibited a layer thickness of approximately 55 to 65 μm. The data in the examples relate to a baking time of 20 minutes at 200° C.

TABLE 1

Test after the behavior with various polyesters and polyacrylate
Examples of formulation with inventive β-hydroxyalkylamide 1a
(matte curing agent) and various resins

| Example | | 1 | 2 | 3 | 4 | 5 | 6 | 7 | 8 |
|---|---|---|---|---|---|---|---|---|---|
| β-Hydroxyalkylamide 1a | wt % | 3.00 | 3.00 | 3.00 | 3.00 | 3.00 | 3.00 | 3.00 | 7.80 |
| CRYLCOAT ® 2618-3 | wt % | 60.70 | — | — | — | — | — | — | — |
| CRYLCOAT ® E 36988 | wt % | — | 60.70 | — | — | — | — | — | — |
| PULVEROL ® 8120 | wt % | — | — | 60.70 | — | — | — | — | — |
| URALAC ® P 800 | wt % | — | — | — | 60.70 | — | — | — | — |
| URALAC ® P 865 | wt % | — | — | — | — | 60.70 | — | — | — |
| CRYLCOAT ® 2617-3 | wt % | — | — | — | — | — | 60.70 | — | — |
| PULVEROL ® 8123 | wt % | — | — | — | — | — | — | 60.70 | — |
| JONCRYL ® SCX 819 | wt % | — | — | — | — | — | — | — | 66.00 |
| KRONOS ® 2160 | wt % | 35.00 | 35.00 | 35.00 | 35.00 | 35.00 | 35.00 | 35.00 | 26.00 |
| RESIFLOW ® PV 88 | wt % | 1.00 | 1.00 | 1.00 | 1.00 | 1.00 | 1.00 | 1.00 | 1.00 |
| Benzoin | wt % | 0.30 | 0.30 | 0.30 | 0.30 | 0.30 | 0.30 | 0.30 | 0.20 |
| Curing at 200° C. | min | 20 | 20 | 20 | 20 | 20 | 20 | 20 | 30 |
| Layer thickness | μm | 67-71 | 57-66 | 57-59 | 57-61 | 66-73 | 54-60 | 52-59 | 58-62 |
| Erichsen indentation | mm | >8 | 4 | >8 | 5 | >8 | >8 | >8 | 6 |
| Direct ball impact | in lb | >80 | >80 | >80 | >80 | >80 | >80 | >80 | 20 |
| Reverse ball impact | in lb | 60 | 60 | 80 | 50 | 80 | 60 | 80 | <10 |
| Gloss at 60° C. incidence | units | 36 | 53 | 44 | 51 | 30 | 33 | 45 | 33 |
| Gloss at 80° C. incidence | units | 44-48 | 62-67 | 53-59 | 60-64 | 39-43 | 41-43 | 55-61 | 59-65 |

By replacing the inventive β-hydroxyalkylamide 1a) with a commercially available β-hydroxyalkylamide such as VESTAGON HA 320 1b), or even by mixing with other commercial products of the same and/or different functionality, it is possible to maintain the gloss in the case of lower admixtures or, if desired, to shift it to higher values by increasing or replacing the additive. This is illustrated here for a polyester in Examples 9 to 13.

Examples of formulation with inventive β-hydroxyalkylamide 1a (matte curing agent) and various resins and with commercial β-hydroxyalkylamide 1b)

TABLE 2

| Example | | 9 | 10 | 11 | 12 | 13 |
|---|---|---|---|---|---|---|
| β-Hydroxy-alkylamide 1a | wt % | 1.90 | 1.75 | 1.50 | 1.00 | 0.25 |
| VERTAGON HA 320 1b | wt % | 1.10 | 1.25 | 1.50 | 2.00 | 2.75 |
| CRYLCOAT ® 2617-3 | wt % | 60.70 | 60.70 | 60.70 | 60.70 | 60.70 |
| KRONOS ® 2160 | wt % | 35.00 | 35.00 | 35.00 | 35.00 | 35.00 |
| RESIFLOW ® PV 88 | wt % | 1.00 | 1.00 | 1.00 | 1.00 | 1.00 |
| Benzoin | wt % | 0.30 | 0.30 | 0.30 | 0.30 | 0.30 |
| Curing at 200° C. | min | 20 | 20 | 20 | 20 | 20 |
| Layer thickness | μm | 57-66 | 57-59 | 57-61 | 66-73 | 54-60 |
| Erichsen indentation | mm | >8 | >8 | >8 | >8 | >8 |
| Direct ball impact | in lb | >80 | >80 | >80 | >80 | >80 |
| Reverse ball impact | in lb | 80 | >80 | >80 | >80 | >80 |
| Gloss at 60° C. incidence | units | 53 | 57 | 62 | 83 | 94 |

Epoxy resins may also be used as co-cross-linking agents. Examples in this regard are glycidyl ethers and glycidyl esters, aliphatic epoxides, diglycidyl ethers based on bisphenol A and glycidyl methacrylates. Examples of such epoxides are triglycidyl isocyanurate (examples of TGIC trade names are ARALDITE PT 810, Huntsman; TEPIC G, Nissan; Taida TGIC, Anhui Taida), mixtures of terephthalic acid diglycidyl esters and trimellitic acid triglycidyl esters (examples of trade names are ARALDITE PT 910 and PT 912, Huntsman), glycidyl esters of versatic acid (example of trade name is CARDURA E10, Shell), 3,4-epoxycyclohexylmethyl-3',4'-epoxycyclohexane carboxylate (ECC), diglycidyl ethers based on bisphenol A (example of trade name is EPIKOTE 828, Shell), ethylhexyl glycidyl ethers, butyl glycidyl ethers, pentaerythritol tetraglycidyl ethers (example of trade name is POLYPDX R 16, UPPC AG) as well as other polypox types containing free epoxy groups. Mixtures may also be used. Preferably TEPIC G or ARALDITE PT 910 and 912 are used.

Such co-cross-linking agents may be employed in proportions of up to 50 wt % of the curing-agent mixture being used in the form of matte curing agents and co-cross-linking agents.

Examples of formulation with inventive β-hydroxyalkylamide 1a (matte curing agent) and co-cross-linking agents

TABLE 3

| Example | | 14 | 15 | 16 | 17 |
|---|---|---|---|---|---|
| β-Hydroxyalkylamide 1a | wt % | 2.95 | 2.90 | 2.80 | 2.50 |
| TEPIC G 3a | wt % | 0.05 | 0.10 | 0.20 | 0.50 |
| CRYLCOAT ® 2617-3 | wt % | 60.70 | 60.70 | 60.70 | 60.70 |
| KRONOS ® 2160 | wt % | 35.00 | 35.00 | 35.00 | 35.00 |
| RESIFLOW ® PV 88 | wt % | 1.00 | 1.00 | 1.00 | 1.00 |
| Benzoin | wt % | 0.30 | 0.30 | 0.30 | 0.30 |
| Curing at 200° C. | min | 20 | 20 | 20 | 20 |
| Layer thickness | μm | 50-56 | 50-55 | 53-62 | 45-51 |
| Erichsen indentation | mm | >8 | >8 | >8 | >8 |

TABLE 3-continued

| Example | | 14 | 15 | 16 | 17 |
|---|---|---|---|---|---|
| Direct ball impact | in lb | >60 | >80 | >80 | >80 |
| Reverse ball impact | in lb | <10 | >80 | >80 | >80 |
| Gloss at 60° incidence | units | 32 | 44 | 45 | 53 |
| Gloss at 85° incidence | units | 40-45 | 58-62 | 57-59 | 65-67 |

Examples 3a, b; 4a, b, c, d; 5

DSC Measurements

The DSC measurements were carried out according to DIN EN ISO 11357-1 of March 2010.

A heat-flow differential calorimeter manufactured by Mettler-Toledo, Model DSC 821, Serial No.: 5116131417 was used. The samples were heated one time from −30° C. to 250° C. at 10 K/min.

Detailed description of the measuring method:
1. Type (heat-flow differential calorimeter or power-compensated calorimeter), model and manufacturer of the DSC instrument used;
2. Material, nature and type of the crucible used, and also mass if necessary;
3. Nature, purity and volume flow of the purge gas used;
4. Nature of the calibration method and details of the calibration substances used, including source, mass and further properties of importance for calibration;
5. Details of sampling, preparation of the sample element and conditioning 1: Heat-flow differential calorimeter
   Manufacturer: Mettler-Toledo
   Model: DSC 821
   Serial No.: 5116131417
2: Crucible material: ultra-pure aluminum
   Size: 40 μL, without pin
   Mettler Order No.: ME-26763
   Mass including lid: approx. 48 mg
3: Purge gas: nitrogen
   Purity: 5.0 (>99.999 vol %)
   Volume flow: 40 mL/min
4: Calibration method: single
   Material 1: indium
   Mettler Calibration Set: ME-51119991
   Mass: approx. 6 mg per weighed sample
   Calibration of temperature (onset) and heat flow
   Material 2: demineralized water
   Dispensed from the in-house system
   Mass: approx. 1 mg per weighed sample
   Calibration of the temperature (onset)
5: Sampling: from delivered sample vials
   Sample weight: 8 to 10 mg
   Sample preparation: pressed onto the crucible bottom with pestle
   Crucible lid: perforated
   Measurement program: −30 to 250° C. at 10 K/min, 1×

Description of the XRPD Measurement:

The powder sample is pressed in a powder holder and measured in the PW1800 x-ray diffractometer of Philips with Cu Kα radiation (1.541 Å) under the following conditions:
   Excitation: 40 kV, 45 mA
   Measurement range: $3° \leq 2\theta \leq 40°$
   Step size: 0.1° (2 theta)
   Time per step: 20 s
   Rotation: ¼ revolution/sec
   Receiving slit: coarse
   Divergence slit: automatic

Examples 3a, b; 4a, b, c, d

| Starting materials | Product description, manufacturer |
|---|---|
| Diethanolamine (DEA) | Dow Chemical |
| Dimethyl 1,4-cyclohexyldicarboxylate (DMCD) (distilled) trans content 15-35 mol % | Dimethyl ester of 1,4-cyclohexanedicarboxylic acid, EASTMAN |
| Sodium methylate | 30% in methanol |

Example 3a

In the three-necked flask with reflux condenser and glass stirrer there are placed 92.24 g dimethyl 1,4-cyclohexyldicarboxylate together with 96.91 g diethanolamine, 10.84 g 30% sodium methylate in methanol and 52 g methanol. A homogeneous solution is formed.

The mixture is boiled in the oil bath for six hours with stirring under reflux (bath temperature 80° C.). In the process, product begins to precipitate out after approximately 0.5 hours.

The reaction mixture is allowed to cool, whereupon further product crystallizes out. Thereafter the precipitated product is separated by filtering off the methanol and is then dried. The yield is more than 80% of theory. Table 3a.

In this way there is obtained an N,N,N',N'-tetrakis(2-hydroxyethyl)cyclohexyl-1,4-diamide in accordance with Formula XIIA with two endothermic peaks (1. at approximately 160° C. and 2. at approximately 190° C.) in the DSC according to FIG. 1 and the XRPD spectrum according to FIGS. 5A and 5B. This product produced in this way achieves intensive matting, in powder lacquers having a gloss of less than 50 scale divisions at an angle of 60° C. Table 3a.

Example 3b

The product produced in 3a is dissolved in boiling water, slowly cooled again, then washed briefly with methanol once again after it has crystallized out. Table 3a.

This product exhibits the two endothermic peaks, see FIG. 2, while a matting effect of 29 scale divisions at an angle of 60 degrees exists in the resulting powder lacquers. Table 3a.

TABLE 3a

End products from discontinuous production in Examples 3a-3b and their characterization by GC analysis [1]

| Example | | 3a | 3b |
|---|---|---|---|
| Starting material | | — | 3a |
| Processing | | Batch production as described in Example 3a | Boil 3a in demineralized water cool slowly crystallize out wash with methanol dry in vacuum |
| [1] DEA | Mass % | 1.22 | <0.1 |
| [1] Trans-N,N,N',N'-tetrakis-(2-hydroxyethyl)cyclohexyl-1,4-diamide | Mass % | 89.34 | 91.81 |
| [1] Cis-N,N,N',N'-tetrakis-(2-hydroxyethyl)cyclohexyl-1,4-diamide | Mass % | 0.74 | 0.00 |
| Σ N,N,N',N'-tetrakis-(2-hydroxyethyl)cyclohexyl-1,4-diamide | Mass % | 90.08 | 91.81 |
| Ratio of [1] trans-N,N,N',N'-tetrakis-(2-hydroxyethyl)cyclohexyl-1,4-diamide to [1] cis-N,N,N',N'-tetrakis-(2-hydroxyethyl)cyclohexyl-1,4-diamide | Mol %<br>Mol % | 99.2<br>0.8 | 100.0<br>0.0 |
| OH number | mg KOH/g | 629 | — |
| Base number | — | 22 | — |
| DSC: $1^{st}$ endothermic peak - Δ H | ° C. - J/g | 159-24 | 164-63 |
| DSC: $2^{nd}$ endothermic peak - Δ H | ° C. - J/g | 186-89 | 203-124 |

| Powder lacquer data | | | |
|---|---|---|---|
| PL experiment number | | 3a | 3b |
| HAA cross-linking agent | Mass % | 3.00 | 3.00 |
| CRYLCOAT ® 2617-3 | Mass % | 60.70 | 60.70 |
| KRONOS ® 2160 | Mass % | 35.00 | 35.00 |
| RESIFLOW ® PV 88 | Mass % | 1.00 | 1.00 |
| Benzoin | Mass % | 0.30 | 0.30 |
| Total | Mass % | 100.00 | 100.00 |
| Curing | Minutes at ° C. | 30 at 200 | 30 at 200 |
| Layer thickness | μm | 64-70 | 70-73 |
| Gloss at 60° incidence | Scale divisions | 30 | 29 |

[1] Analytical values by GC
GC after silylation with Silyl 991 (BSTFA-TMCS 99:1) Firm of Macherey and Nagel, Order No. 701.490.150. Silylation: Heat 1 mL Silyl 991, 1 mL pyridine, 35 mg reaction product, 35 mg C-18 hydrocarbon as internal standard, 30 minutes at 80° C. in a closed ampoule.
OH number: DIN 53240
Base number: DIN 53176

Production Example A

Production of a β-hydroxyalkylamide of Formula XIIA from dimethyl 1,4-cyclohexyldicarboxylate and diethanolamine in the extruder

| Starting substances | Product description, manufacturer |
|---|---|
| Diethanolamine (DEA) | Dow Chemical |
| Dimethyl 1,4-cyclohexyldicarboxylate (DMCD), trans content 15-35 mol % | Dimethyl ester of 1,4-cyclohexanedicarboxylic acid, EASTMAN |
| Sodium methylate | 30% in methanol |

Three substance streams were used:
Stream 1 comprised DMCD
Stream 2 comprised DEA
Stream 3 comprised the catalyst, in the form of methanolic sodium methylate solution.

The substance streams were metered in such a way that the molar ratio between dimethyl 1,4-cyclohexyldicarboxylate and diethanolamine was 1:1.95.

The total amount of catalyst (sodium methylate only, calculated as solvent-free) relative to the total formulation was 0.50 to 3.0%.

Stream 1 was fed at a rate of 10.0 kg/h into the first housing of a twin-screw extruder (ZSK 30, 32 d) (temperature of the substance stream 80 to 130° C.).

Stream 2 was fed at a rate of 9.9 kg/h (temperature of the substance stream 65 to 145° C.).

Stream 3 was atomized into stream 2 (0.5 to 2.0 kg/h) upstream from the inlet into the extruder.

The extruder used comprised 8 housings, each capable of being separately heated and cooled. Housings 1-5: 160° C., housings 6-8: 120-160° C.

Housings 3, 5 and 8 were equipped with a vacuum dome (100 to 600 mbar).

The extruder screws were equipped with conveyor elements. Kneader blocks were installed upstream from the vacuum domes.

All temperatures represented target temperatures. They were regulated by electrical heating and water cooling. The extruder head was also heated electrically (100-160° C.).

The screw speed was 300 rpm. The reaction product was discharged from the extruder via a gear pump. The total throughput rate was 20 kg/h.

The end product was cooled via a length of pipe or via an extruder, passed onto a cooling belt and further cooled.

Examples 4a and 4b

4a

An N,N,N',N'-tetrakis-(2-hydroxyethyl)cyclohexyl-1,4-diamide having product data 4a is produced in the extruder (Werner and Pfleiderer ZSK 30, 32 d) in a manner analogous to that described in Example A. Table 4

4b

This product described and produced as in Example 4a is recrystallized. For this purpose, the product from Example 4a is dissolved in demineralized water under boiling conditions and then slowly cooled and recrystallized, in this way transforming it once again to the solid form. Thereafter it was washed with methanol and dried at approximately 20 mbar and 50° C. in the vacuum drying oven. Table 4

In this way there is obtained an N,N,N',N'-tetrakis-(2-hydroxyethyl)cyclohexyl-1,4-diamide with two endothermic peaks (1. at approximately 160° C. and 2. at approximately 190° C.) in the DSC. This product with the two peaks in the DSC according to FIG. 3 and the XRPD spectrum according to FIG. 7 achieves intensive matting in powder lacquers having a gloss of 30 scale divisions at an angle of 60°. Table 4

Comparison Example 4c

A non-inventive N,N,N',N'-tetrakis-(2-hydroxyethyl)cyclohexyl-1,4-diamide having the DSC according to FIG. 4 was produced. This product exhibited only one endothermic peak at approximately 190° C. in the DSC according to FIG. 4 and an XRPD spectrum according to FIGS. 6A and 6B. The powder lacquer produced therefrom exhibits no intensive matting, but instead a gloss of 95 scale divisions at an angle of 60°. Table 4

Example 4d

An N,N,N',N'-tetrakis-(2-hydroxyethyl)cyclohexyl-1,4-diamide of Formula XIIA having product data 4d is produced in the extruder (Werner and Pfleiderer ZSK 30, 32 d) in a manner analogous to that described in Example 1. Table 4 This product produced in this way is conveyed on a cooling belt and collected. This material is then heat-treated in the drying oven at 80° C. for 24 hours under vacuum, and the product obtained in this way is then ground.

This product achieves intensive matting in powder lacquers having a gloss of 40 scale divisions at an angle of 60°. Table 4

TABLE 4

End products from continuous production in Examples 4a-4b and their characterization according to GC analysis [1]

| Product examples | | 4a | 4b | 4d |
|---|---|---|---|---|
| Starting material | | — | SK 988 | |
| Processing | | Extruder setting as described in Example 1 | Dissolve 4a in demineralized water cool slowly crystallize out wash with methanol dry in vacuum | Extruder setting as described in Example 1 heat treatment for 24 hours at 80° C. in vacuum |
| [1] DEA proportion | Mass % | 2.17 | 0.11 | 1.2 |
| [1] Trans-N,N,N',N'-tetrakis-(2-hydroxyethyl)cyclohexyl-1,4-diamide | Mass % | 84.25 | 93.72 | 91.3 |
| [1] Cis-N,N,N',N'-tetrakis-(2-hydroxyethyl)cyclohexyl-1,4-diamide | Mass % | 1.60 | 0.11 | 0.66 |

TABLE 4-continued

| | | | | |
|---|---|---|---|---|
| Σ N,N,N',N'-tetrakis-(2-hydroxyethyl)cyclohexyl-1,4-diamide | Mass % | 85.85 | 93.83 | 91.96 |
| Ratio of [1)] trans-N,N,N',N'-tetrakis-(2-hydroxyethyl)cyclohexyl-1,4-diamide | Mol % | 98.1 | 99.9 | 99.3 |
| to [1)] cis-N,N,N',N'-tetrakis-(2-hydroxyethyl)cyclohexyl-1,4-diamide | Mol % | 1.9 | 0.1 | 0.7 |
| OH number | mg KOH/g | 641 | 625 | |
| Base number | — | | 24 | 1.1 |
| DSC: $1^{st}$ endothermic peak - Δ H | ° C. - J/g | | 162-61 | 158-50 |
| DSC: $2^{nd}$ endothermic peak - Δ H | ° C. - J/g | | 200-128 | 188-115 |
| Powder lacquer data | | | | |
| PL experiment number | | | 4a | 4d |
| HAA cross-linking agent | Mass % | | 3.00 | 3.00 |
| CRYLCOAT ® 2617-3 | Mass % | | 60.70 | 60.70 |
| KRONOS ® 2160 | Mass % | | 35.00 | 35.00 |
| RESIFLOW ® PV 88 | Mass % | | 1.00 | 1.00 |
| Benzoin | Mass % | | 0.30 | 0.30 |
| Total | Mass % | | 100.00 | 100.00 |
| Curing | Minutes at ° C. | | 30 at 200 | 30 at 200 |
| Layer thickness | μm | | 52-55 | 58-68 |
| Gloss at 60° incidence | Scale divisions | | 29-30 | 40 |

End products from production of Comparison Examples 4c and their characterization according to GC analysis [1)] and powder lacquer

| Comparison example | | 4c |
|---|---|---|
| Starting material | | |
| Processing | | allow to cool at RT |
| [1)] DEA | Mass % | 2.87 |
| [1)] Trans-N,N,N',N'-tetrakis-(2-hydroxyethyl)cyclohexyl-1,4-diamide | Mass % | 64.11 |
| [1)] Cis-N,N,N',N'-tetrakis-(2-hydroxyethyl)cyclohexyl-1,4-diamide | Mass % | 15.84 |
| Σ N,N,N',N'-tetrakis-(2-hydroxyethyl)cyclohexyl-1,4-diamide | Mass % | 79.95 |
| Ratio of [1)] trans-N,N,N',N'-tetrakis-(2-hydroxyethyl)cyclohexyl-1,4-diamide | Mol % | 80.19 |
| to [1)] cis-N,N,N',N'-tetrakis-(2-hydroxyethyl)cyclohexyl-1,4-diamide | Mol % | 19.81 |
| OH number | mg KOH/g sample | — |
| Base number | — | — |
| DSC: $1^{st}$ endothermic peak - Δ H | ° C. - J/g | |
| DSC: $2^{nd}$ endothermic peak - Δ H | ° C. - J/g | 171-87 |
| Powder lacquer data | | |
| PL experiment number | | 4c |
| HAA cross-linking agent | Mass % | 3.00 |
| CRYLCOAT ® 2617-3 | Mass % | 60.70 |
| KRONOS ® 2160 | Mass % | 35.00 |
| RESIFLOW ® PV 88 | Mass % | 1.00 |
| Benzoin | Mass % | 0.30 |
| Total | Mass % | 100.00 |
| Curing | Minutes at ° C. | 30 at 200 |
| Layer thickness | μm | 65-78 |
| Gloss at 60° incidence | Scale divisions | 95 |

[1)] Analytical values by GC. GC after silylation with Silyl 991 (BSTFA-TMCS 99:1) Firm of Macherey and Nagel, Order No. 701.490.150. Silylation: Heat 1 mL Silyl 991, 1 mL pyridine, 35 mg reaction product, 35 mg C-18 hydrocarbon as internal standard, 30 minutes at 80° C. in a closed ampoule.
OH number: DIN 53240
Base number: DIN 53176

Example 5

A β-hydroxyalkylamide of Formula XIIA was produced as in Example 3a. A single crystal was grown from this. The inventive of Formula XIIA was investigated by x-ray structure analysis of a single crystal. Detailed results of the measurement are compiled in Appendix 1. and FIGS. 8 and 9.

APPENDIX 1

Single Crystal X-Ray Structural Analysis
Analysis method: Single crystal x-ray structure analysis "2012-0573602-06D"
Report: WHC 11/11 EKS
Sample received: 2011-02-22
Report date: 2011-02-25
Objective: Determination of the single crystal structure
Compound: N,N,N',N'-tetrakis-(2-hydroxyethyl)cyclohexyl-1,4-diamide Formula XIIA

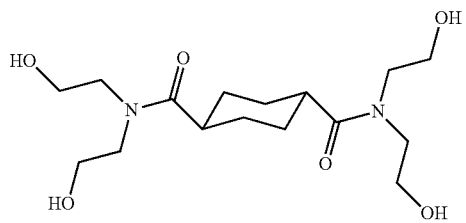 [SMILES: O=C(C1CCC(C(=O)N(CCO)CCO)CC1)N(CCO)CCO]

Crystallization: by the chemist
Crystal dimensions: colorless block, 0.50×0.40×0.40 mm³
Code: vesta
Comments: The asymmetric unit contains one half molecule

Experimental

The single crystal structure was determined with an instrument of the firm of Oxford Diffraction, which was equipped with a CCD detector (Ruby model), a conventional x-ray tube with $Cu_{K\alpha}$ radiation, Osmic mirror as monochromator and a low-temperature system of the Cryojet type (T=100 K). Data collection was performed in phi and omega scans. Data collection and reduction were performed with Crysalis (Oxford Diffraction 2007).

Structure solution and refinement were achieved with SHELXTL (V. 6.10, Sheldrick, University of Gottingen, 2000). All non-hydrogen atoms were refined anisotropically. The hydrogen atoms were refined as riding groups.
Tables

TABLE a

| Crystal data and data for structure refinement for vesta. | |
|---|---|
| Identification code | vesta |
| Molecular formula | C16 H30 N2 O6 |
| Formula weight | 346.42 |
| Temperature | 100 K |
| Wavelength | 1.54178 Å |
| Crystal system | Orthorhombic |
| Space group | Pbca |
| Unit cell | a = 10.06350(10) Å α = 90° |
| | b = 11.85290(10) Å β = 90° |
| | c = 14.6275(2) Å γ = 90° |
| Volume | 1744.79(3) Å³ |
| Z | 4 |

TABLE a-continued

| Crystal data and data for structure refinement for vesta. | |
|---|---|
| Density (calculated) | 1.319 mg/m³ |
| Absorption coefficient | 0.832 mm⁻¹ |
| F(000) | 752 |
| Crystal dimensions | 0.50 × 0.40 × 0.40 mm³ |
| Theta range for data collection | 6.05 to 65.68° |
| Index range | −11 ≤ h ≤ 10, −12 ≤ k ≤ 14, −14 ≤ l ≤ 17 |
| Number of reflections collected | 9191 |
| Symmetry-independent reflections | 1482 [R(int) = 0.0345] |
| Completeness to theta = 65.68° | 98.5% |
| Absorption correction | Crysalis |
| Refinement | Full matrix least squares on F² |
| Data/restraints/parameters | 1482/0/111 |
| Goodness-of-fit on F² | 1.065 |
| Final R values [I > 2 sigma(I)] | R1 = 0.0316, wR2 = 0.0792 |
| R values (all data) | R1 = 0.0358, wR2 = 0.0817 |
| Largest difference peaks | 0.199 and −0.189 e. Å⁻³ |

TABLE b

| Bond lengths [Å] and angles [°] for vesta | |
|---|---|
| O(1)-C(4) | 1.2478(15) |
| O(2)-C(6) | 1.4221(15) |
| O(3)-C(8) | 1.4205(16) |
| N(1)-C(4) | 1.3479(16) |
| N(1)-C(5) | 1.4741(15) |
| N(1)-C(7) | 1.4727(15) |
| C(1)-C(3)#1 | 1.5291(17) |
| C(1)-C(2) | 1.5398(16) |
| C(2)-C(4) | 1.5189(17) |
| C(2)-C(3) | 1.5405(16) |
| C(3)-C(1)#1 | 1.5291(17) |
| C(5)-C(6) | 1.5182(16) |
| C(7)-C(8) | 1.5159(17) |
| C(4)-N(1)-C(5) | 124.59(10) |
| C(4)-N(1)-C(7) | 117.87(10) |
| C(5)-N(1)-C(7) | 117.54(9) |
| C(3)#1-C(1)-C(2) | 110.62(10) |
| C(4)-C(2)-C(1) | 111.04(10) |
| C(4)-C(2)-C(3) | 108.67(10) |
| C(1)-C(2)-C(3) | 110.09(10) |
| C(1)#1-C(3)-C(2) | 111.18(10) |
| O(1)-C(4)-N(1) | 119.97(11) |
| O(1)-C(4)-N(2) | 120.15(10) |
| N(1)-C(4)-C(2) | 119.84(10) |
| N(1)-C(5)-C(6) | 113.66(9) |
| O(2)-C(6)-C(5) | 110.97(10) |
| N(1)-C(7)-C(8) | 113.52(10) |
| O(3)-C(8)-C(7) | 113.31(10) |

Symmetry operations for generation of equivalent atoms:
1 −x+1,−y+1,−z

TABLE c

| Torsion angles [°] for vesta | |
|---|---|
| C(3)#1-C(1)-C(2)-C(4) | 177.11(9) |
| C(3)#1-C(1)-C(2)-C(3) | 56.72(14) |
| C(4)-C(2)-C(3)-C(1)#1 | −178.85(9) |
| C(1)-C(2)-C(3)-C(1)#1 | −57.04(14) |
| C(5)-N(1)-C(4)-O(1) | 176.19(10) |
| C(7)-N(1)-C(4)-O(1) | −3.65(16) |
| C(5)-N(1)-C(4)-C(2) | −6.21(16) |
| C(7)-N(1)-C(4)-C(2) | 173.95(10) |
| C(1)-C(2)-C(4)-O(1) | −54.62(14) |
| C(3)-C(2)-C(4)-O(1) | 66.61(14) |
| C(1)-C(2)-C(4)-N(1) | 127.78(11) |
| C(3)-C(2)-C(4)-N(1) | −110.98(12) |
| C(4)-N(1)-C(5)-C(6) | 80.57(13) |
| C(7)-N(1)-C(5)-C(6) | −99.58(12) |
| N(1)-C(5)-C(6)-O(2) | 61.92(13) |

TABLE c-continued

| Torsion angles [°] for vesta | |
|---|---|
| C(4)-N(1)-C(7)-C(8) | 86.25(13) |
| C(5)-N(1)-C(7)-C(8) | −93.60(12) |
| N(1)-C(7)-C(8)-O(3) | 73.97(13) |

Symmetry operations for generation of equivalent atoms:
1 −x+1,−y+1,−z

The invention claimed is:

1. A powder-lacquer composition, comprising:
A) at least one carboxylate-group-comprising polymer having an acid number of 5 to 250 mg KOH/g and a glass transition temperature $T_g$ higher than 40° C.; and
B) at least one β-hydroxyalkylamide having two or three or four β-hydroxyalkylamide groups per molecule of formula (I)

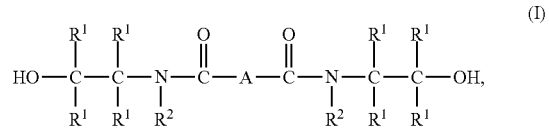

wherein
$R^1$ and $R^2$, independently of one another denote the same or different radicals, selected from the group consisting of an alkyl radical, a cycloalkyl radical, an aryl radical, an aralkyl radical, and an alkenyl radical, having 1-24 carbon atoms, optionally comprising at least one member selected from the group consisting of a heteroatom and a functional group,
or $R^1$ is hydrogen,
or $R^2$ is

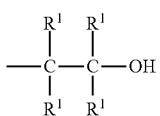

and A is at least one member selected from the group consisting of

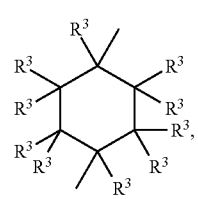

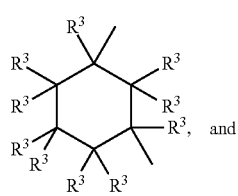

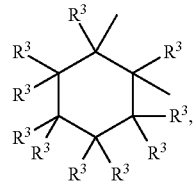

wherein $R^3$ independently of one another denote the same or different radicals, selected from the group consisting of hydrogen, an alkyl radical, a cycloalkyl radical, an aryl radical, an aralkyl radical, and an alkenyl radical, having 1-24 carbon atoms, optionally comprising at least one member selected from the group consisting of a heteroatom and a functional group, and wherein two or more $R^3$ substituents are optionally linked to one another to form rings;
wherein the β-hydroxyalkylamide exists in solid form below 150° C.;
C) optionally, at least one member selected from the group consisting of a processing aid and an additive;
wherein a ratio of β-hydroxyalkylamide groups to carboxylate groups ranges between 0.5:1 and 1.5:1,
and wherein component (B) has two endothermic peaks according to DSC analysis (differential scanning calorimetry).

2. The composition of claim 1, wherein a starting compound for the β-hydroxyalkylamide comprises at least one β-hydroxyalkylamine comprising alkyl groups comprising at least 2 to 10 carbon atoms in a hydrocarbon skeleton of the β-hydroxyalkylamine, wherein the alkyl groups are optionally linear, branched or even cyclic, and wherein the alkyl groups are optionally substituted with at least one member selected from the group consisting of a heteroatom and a functional group, and optionally comprise an additional alkyl radical on a nitrogen of the alkyl group.

3. The composition of claim 1, comprising at least one β-hydroxyalkylamide of at least one member selected from the group consisting of an N-alkyl-1,2-alkanolamine and an N,N-bis-2-hydroxyalkylamine, and at least one ester of a cyclohexanedicarboxylic acid.

4. The composition of claim 1, wherein a starting compound for the β-hydroxyalkylamide comprises at least one β-hydroxyalkylamine of a formula selected from the group consisting of (II) and (III):

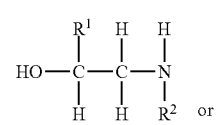

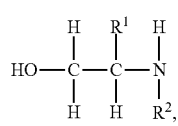

wherein
R¹ denotes hydrogen, methyl, ethyl, or propyl, and
R² denotes methyl;

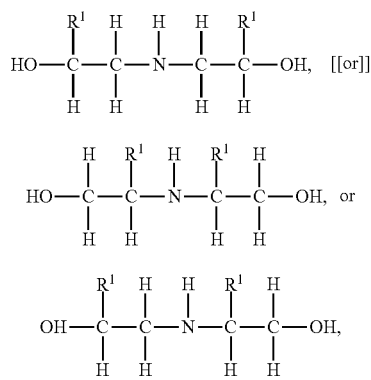

(III)
(III)
(III)

wherein R¹ denotes hydrogen, methyl, ethyl, or propyl, either simultaneously or independently of one another.

5. The composition of claim 1, wherein a starting compound for the β-hydroxyalkylamide comprises at least one member selected from the group consisting of diethanolamine (DEA), diisopropanolamine (DIPA), di-sec-butanolamine, N-methylethanolamine, and N-methyl-isopropanolamine.

6. The composition of claim 1, wherein a starting compound for the β-hydroxyalkylamide comprises at least one member selected from the group consisting of a 1,2 substituted cyclohexanedicarboxylic acid derivative, a 1,3-substituted cyclohexanedicarboxylic acid derivative, and a 1,4-substituted cyclohexanedicarboxylic acid derivative.

7. The composition of claim 1, wherein a starting compound for the β-hydroxyalkylamide comprises at least one compound of formula (IV) selected from the group consisting of

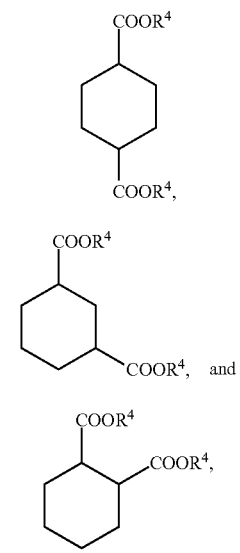

(IV)
(IV)
(IV)

wherein R⁴ denotes methyl, ethyl, propyl, or butyl simultaneously or independently of one another.

8. The composition of claim 1, wherein a starting compound for the β-hydroxyalkylamide comprises at least one 1,4-substituted cyclohexanedicarboxylic acid ester.

9. The composition of claim 1, wherein the β-hydroxyalkylamide comprises at least one member selected from the group consisting of:

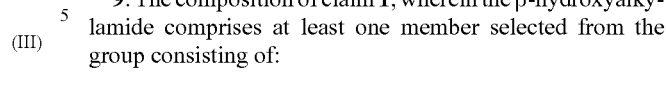

Formula (V)

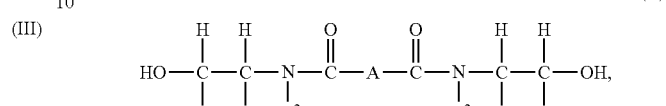

Formula (VI)

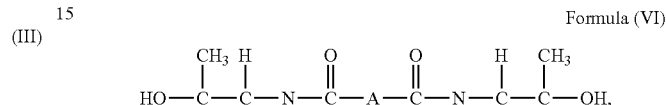

Formula (VII)

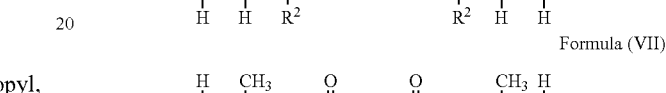

Formula (VIII)

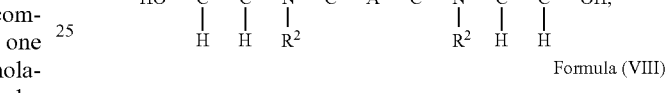

Formula (IX)

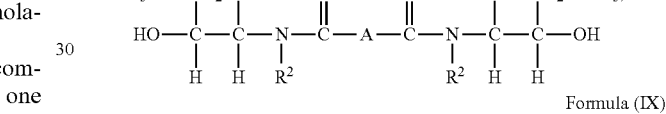

Formula (X)

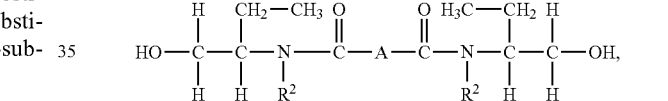

Formula (XI)

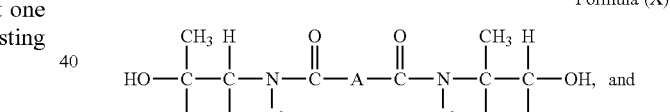

wherein
R² is methyl, or

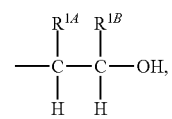

wherein R¹ᴬ denotes hydrogen and R¹ᴮ denotes methyl, ethyl, or propyl,
or
wherein R¹ᴬ denotes methyl, ethyl, propyl and R¹ᴮ denotes hydrogen;
and A is a 1,4-disubstituted cyclohexane ring of formula

wherein a trans content of A is ≧70 mol %;
and wherein the β-hydroxyalkylamide exists in solid form below 150° C.

10. The composition of claim 1, wherein the β-hydroxyalkylamide is of at least one dialkyl-1,4-cyclohexyldicarboxylate, having a trans content, relative to a position of the carboxyl groups on the cyclohexyl ring, of greater than or equal to 70 mol %.

11. The composition of claim 1, wherein the β-hydroxyalkylamide comprises, in reacted form, dimethyl-1,4-cyclohexyldicarboxylate and diethanolamine, and has four β-hydroxyalkylamide groups per molecule according to formula XII, Formula (XII)

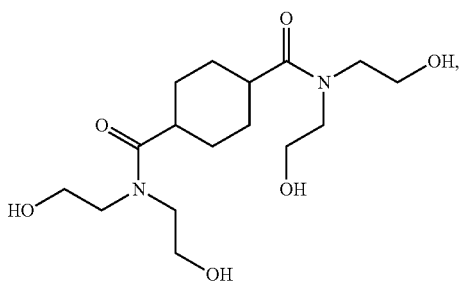

with a trans content on the cyclohexyl ring of greater than or equal to 70 mol %.

12. The composition of claim 1, wherein the β-hydroxyalkylamide exists in solid form in an entire temperature range below 150° C.

13. The composition of claim 1, wherein the at least one carboxylate-group-comprising polymer A) is a polyester having:
a glass transition temperature $T_g$ ranging from 40 to 80° C.;
an acid number varying from 5 to 250 mg KOH/g;
an OH number smaller than 15 mg KOH/g; and
an average molecular weight $M_w$ of 1,000 to 10,000 g/mol.

14. The composition of claim 1, wherein the at least one carboxylate-group-comprising polymer A) is an acrylate having
an OH number smaller than 10 mg KOH/g;
an acid number of 5 to 350 mg KOH/g;
a $T_g$ of 40 to 110° C.; and
an $M_w$ of 500 to 50,000 g/mol.

15. The composition of claim 1, further comprising:
at least one member selected from the group consisting of
a co-cross-linking agent comprising an epoxy resin and
a β-hydroxyalkylamide different from B).

16. A method for producing the composition of claim 1, comprising coextruding components A), B), and optionally C), in a molten state at temperatures between 80 and 150° C.

17. A coating, comprising the composition of claim 1, wherein the coating has a matte surface, with a specular gloss according to DIN 67530/ISO 2813 of <50 at an angle of incidence of 60°.

18. The composition of claim 1, wherein component B) comprises:
N,N,N',N'-tetrakis-(2-hydroxyethyl)cyclohexyl-1,4-diamide of Formula XIIA,

XIIA

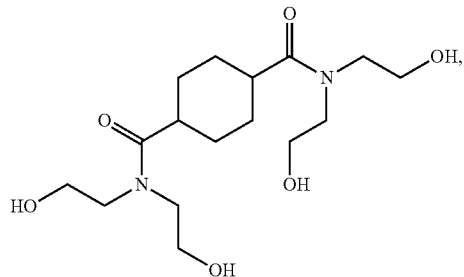

having the following parameters:
1. a trans content on the cyclohexyl ring of greater than or equal to 70 mol % relative to a total proportion of all isomers of N,N,N',N'-tetrakis-(2-hydroxyethyl)cyclohexyl-1,4-diamide present,
and
2. two endothermic peaks according to DSC analysis (differential scanning calorimetry), peak 1 being situated in a range of 140-170° C. with a maximum of 155-165° C., and peak 2 being situated in a range of 170-210° C. with a maximum of 175-207° C.,
and
3. a ratio of enthalpies of endothermic peak 1 to endothermic peak 2 is 1:1 to 1:5,
and
4. an XRPD spectrum of a powder sample in an x-ray diffractometer measured with Cu Kα radiation (1.541 Å) exhibits the following peaks:

| Peak No. | Degrees 2 theta ± 0.2 degrees 2 theta | d (Å) |
| --- | --- | --- |
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43. |

19. The composition of claim 18, with a trans content on the cyclohexyl ring of greater than or equal to 92 mol % relative to the total proportion of all isomers of N,N,N',N'-tetrakis-(2-hydroxyethyl)cyclohexyl-1,4-diamide present.

20. The composition of claim 18, wherein the β-hydroxyalkylamide of Formula XIIA exists in solid form in an entire temperature range below 175° C.

21. The composition of claim 18, wherein a concentration of all isomers of the N,N,N',N'-tetrakis-(2-hydroxyethyl)cyclohexyl-1,4-diamide in an end product after its production is 75 mass %.

22. The composition of claim 18, wherein the ratio of the enthalpies of endothermic peak 1 (~160° C.) to endothermic peak 2 (~190° C.) is 1:1 to 1:3.

23. The composition of claim 1, wherein component B) comprises: N,N,N',N'-tetrakis-(2-hydroxyethyl)cyclohexyl-1,4-diamide of Formula XIIA,

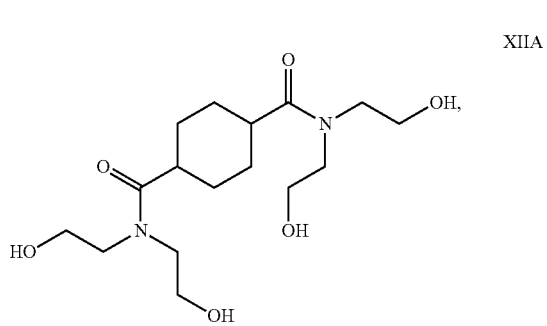 [SMILES: O=C(C1CCC(C(=O)N(CCO)CCO)CC1)N(CCO)CCO]

having the following parameters:
1. a trans content on the cyclohexyl ring of greater than or equal to 70 mol % relative to a total proportion of all isomers of N,N,N',N'-tetrakis-(2-hydroxyethyl)cyclohexyl-1,4-diamide present,
and
2. two endothermic peaks according to DSC analysis (differential scanning calorimetry), peak 1 being situated in a range of 140-170° C. with a maximum of 155-165° C., and peak 2 being situated in a range of 170-210° C. with a maximum of 175-207° C.,
and
3. the ratio of a enthalpies of endothermic peak 1 to endothermic peak 2 is 1:1 to 1:5,
and
4. an XRPD spectrum of a powder sample in an x-ray diffractometer measured with Cu Kα radiation (1.541 Å) exhibits the following peaks:

| Peak No. | Degrees 2 theta ± 0.2 degrees 2 theta | d (Å) |
| --- | --- | --- |
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

5. and having, according to x-ray structure analysis of a single crystal, the following parameters:

| | | |
| --- | --- | --- |
| Crystal system | Orthorhombic | |
| Space group: | Pbca | |
| Unit cell dimensions: | a = 10.06350(10) Å | α = 90°, |
| | b = 11.85290(10) Å | β = 90°, |
| | c = 14.6275(2) Å | γ = 90°, |
| Volume: | 1744.79(3) Å³. | |

24. A coating, comprising the composition of claim 18, having a matte surface, with a gloss of <50 units, measured as reflectometer values according to DIN 67530/ISO 2813 at an angle of incidence of 60°.

25. A coating, comprising the composition of claim 23, having a matte surface, with a gloss of <50 units, measured as reflectometer values according to DIN 67530/ISO 2813 at an angle of incidence of 60°.

26. The method of claim 16, wherein component B) comprises N,N,N',N'-tetrakis-(2-hydroxyethyl)cyclohexyl-1,4-diamide of Formula XIIA,

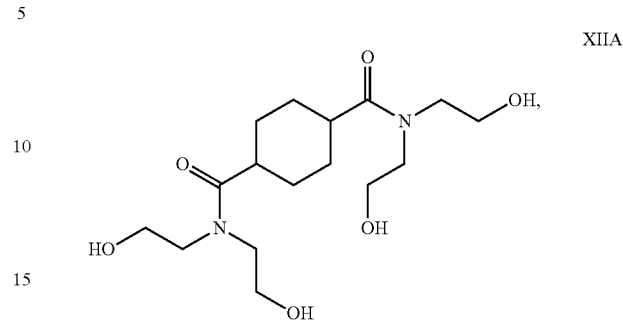

having the following parameters:
1. a trans content on the cyclohexyl ring of greater than or equal to 70 mol % relative to a total proportion of all isomers of N,N,N',N'-tetrakis-(2-hydroxyethyl)cyclohexyl-1,4-diamide present,
and
2. two endothermic peaks according to DSC analysis (differential scanning calorimetry), peak 1 being situated in a range of 140-170° C. with a maximum of 155-165° C., and peak 2 being situated in a range of 170-210° C. with a maximum of 175-207° C.,
and
3. a ratio of enthalpies of endothermic peak 1 to endothermic peak 2 is 1:1 to 1:5,
and
4. an XRPD spectrum of the powder sample in an x-ray diffractometer measured with Cu Kα radiation (1.541 Å) exhibits the following peaks:

| Peak No. | Degrees 2 theta ± degrees 2 theta | d (Å) |
| --- | --- | --- |
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43. |

27. The method of claim 16, wherein component B) comprises N,N,N',N'-tetrakis-(2-hydroxyethyl)cyclohexyl-1,4-diamide of Formula XIIA,

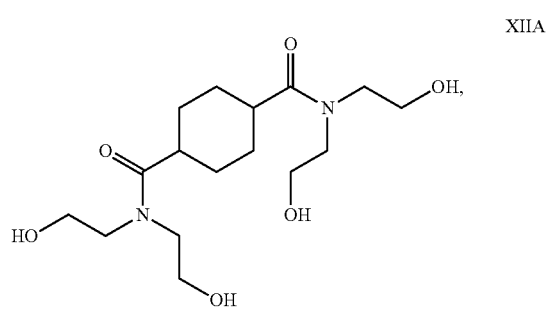 [SMILES: O=C(C1CCC(C(=O)N(CCO)CCO)CC1)N(CCO)CCO]

having the following parameters:

1. a trans content on the cyclohexyl ring of greater than or equal to 70 mol % relative to a total proportion of all isomers of N,N,N',N'-tetrakis-(2-hydroxyethyl)cyclohexyl-1,4-diamide present,
and
2. two endothermic peaks according to DSC analysis (differential scanning calorimetry), peak 1 being situated in a range of 140-170° C. with a maximum of 155-165° C., and peak 2 being situated in a range of 170-210° C. with a maximum of 175-207° C.,
and
3. a ratio of the enthalpies of endothermic peak 1 to endothermic peak 2 is 1:1 to 1:5,
and
4. an XRPD spectrum of the powder sample in an x-ray diffractometer measured with Cu Kα radiation (1.541 Å) exhibits the following peaks:

| Peak No. | Degrees 2 theta ± degrees 2 theta | d (Å) |
|---|---|---|
| 1 | 14.90 | 5.94 |
| 2 | 16.70 | 5.31 |
| 3 | 17.40 | 5.09 |
| 4 | 21.20 | 4.19 |
| 5 | 21.60 | 4.11 |
| 6 | 26.00 | 3.43 |

5. and having, according to x-ray structure analysis of a single crystal, the following parameters:

| Crystal system | Orthorhombic | |
|---|---|---|
| Space group: | Pbca | |
| Unit cell dimensions: | a = 10.06350(10) Å | α = 90°, |
| | b = 11.85290(10) Å | β = 90°, |
| | c = 14.6275(2) Å | γ = 90°, |
| Volume: | 1744.79(3) Å³. | |

\* \* \* \* \*